(12) United States Patent
Inomata et al.

(10) Patent No.: US 12,509,626 B2
(45) Date of Patent: Dec. 30, 2025

(54) WAVELENGTH CONVERSION MEMBER

(71) Applicant: NATIONAL INSTITUTE FOR MATERIALS SCIENCE, Ibaraki (JP)

(72) Inventors: Daisuke Inomata, Tokyo (JP); Rikiya Suzuki, Tokyo (JP); Yusuke Arai, Tokyo (JP); Yoshihiro Yamashita, Tokyo (JP); Hiroyuki Sawano, Tokyo (JP); Kiyoshi Shimamura, Ibaraki (JP); Encarnacion Antonia Garcia Villora, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 941 days.

(21) Appl. No.: 17/766,282

(22) PCT Filed: Sep. 30, 2020

(86) PCT No.: PCT/JP2020/037273
§ 371 (c)(1),
(2) Date: Apr. 4, 2022

(87) PCT Pub. No.: WO2021/066054
PCT Pub. Date: Apr. 8, 2021

(65) Prior Publication Data
US 2023/0323198 A1    Oct. 12, 2023

(30) Foreign Application Priority Data
Oct. 3, 2019    (JP) ................. 2019-183330

(51) Int. Cl.
C09K 11/02  (2006.01)
C09K 11/77  (2006.01)
G02B 26/00  (2006.01)
H01S 5/00   (2006.01)

(52) U.S. Cl.
CPC .......... *C09K 11/02* (2013.01); *C09K 11/7774* (2013.01); *G02B 26/007* (2013.01); *H01S 5/0087* (2021.01)

(58) Field of Classification Search
None
See application file for complete search history.

(56) References Cited

U.S. PATENT DOCUMENTS

| | | |
|---|---|---|
| 7,265,371 B2 | 9/2007 | Shoji et al. |
| 10,094,529 B2 | 10/2018 | Nagasaki et al. |
| 10,508,801 B2 | 12/2019 | Sato et al. |
| 10,590,341 B2 | 3/2020 | Sato et al. |
| 11,525,082 B2 | 12/2022 | Inomata et al. |
| 2005/0274916 A1 | 12/2005 | Shoji et al. |
| 2007/0052342 A1 | 3/2007 | Masuda et al. |
| 2015/0219291 A1 | 8/2015 | Yamaguchi |
| 2017/0307163 A1 | 10/2017 | Nagasaki et al. |
| 2019/0024879 A1 | 1/2019 | Sato et al. |
| 2019/0127636 A1 | 5/2019 | Sato et al. |
| 2019/0171093 A1 | 6/2019 | Furuyama et al. |
| 2021/0122975 A1 | 4/2021 | Inomata et al. |

FOREIGN PATENT DOCUMENTS

| | | |
|---|---|---|
| CN | 107305921 A | 10/2017 |
| CN | 107978663 A | 5/2018 |
| CN | 108474881 A | 8/2018 |
| CN | 108603113 A | 9/2018 |
| CN | 109073801 A | 12/2018 |
| EP | 3 412 752 A1 | 12/2018 |
| JP | 2006010388 A | 1/2006 |
| JP | 2007191680 A | 8/2007 |
| JP | 2012008177 A | 1/2012 |
| JP | 2017137394 A | 8/2017 |
| JP | 6232951 B2 | 11/2017 |
| JP | 2017-215386 A | 12/2017 |
| JP | 2018087327 A | 6/2018 |
| JP | 2019039992 A | 3/2019 |
| JP | 2019164302 A | 9/2019 |
| WO | 2018/074132 A1 | 4/2018 |
| WO | 2019181478 | 9/2019 |

OTHER PUBLICATIONS

International Search Report dated Dec. 15, 2020 issued in PCT/JP2020/037273.
Japanese Office Action dated Dec. 21, 2021 issued in JP 2019-183330.
Notification of First Office Action dated Mar. 31, 2023 received from the China National Intellectual Property Administration in related application CN 202080069996.5 together with English language translation.
Notification of Second Office Action dated Oct. 17, 2023 received from the China National Intellectual Property Administration in related application CN 202080069996.5 together with English language translation.
Japanese Official Action dated Sep. 12, 2023 from related JP 2019-183330 together with an English language translation.
(Continued)

*Primary Examiner* — Cheng Yuan Huang
(74) *Attorney, Agent, or Firm* — Scully, Scott, Murphy & Pressser, P.C.

(57) ABSTRACT

A wavelength conversion member includes a support, and a wavelength conversion layer that includes a phosphor particle group and a sealing member to seal the phosphor particle group and that is provided directly or through an other layer on the support. A predetermined region, in which a cross-sectional area rate of the phosphor particle group is not less than 50%, is included in an arbitrary cross section of the wavelength conversion layer taken parallel to a thickness direction thereof. The predetermined region includes a rectangular region with a width of 700 μm and a thickness of 50 μm from a bottom surface of the wavelength conversion layer when a thickness of the wavelength conversion layer is not less than 50 μm, or a rectangular region with a width of 700 μm and a thickness equal to the thickness of the wavelength conversion layer when it is less than 50 μm.

10 Claims, 29 Drawing Sheets

(56) References Cited

OTHER PUBLICATIONS

Extended European Search Report dated Sep. 5, 2023 from related EP 20 87 1164.8.
Trial and Appeal Decision dated Dec. 12, 2023 from related JP 2019-183330 together with English language translation.
Translation of International Preliminary Report on Patentability and Written Opinion dated Apr. 14, 2022 issued in PCT/JP2020/037273.
Chinese Official Action dated Feb. 27, 2024 received from the China National Intellectual Property Administration in related application CN 202080069996.5, together with an English language translation.
Japanese Official Action dated Jun. 21, 2022 from related JP 2019-183330 together with an English language translation.
European Official Action dated Oct. 11, 2024 received from the European Patent Office in related application 20 871 164.8.

WAVELENGTH CONVERSION MEMBER

TECHNICAL FIELD

The present invention relates to a wavelength conversion member.

BACKGROUND ART

A wavelength conversion member used in a laser projector is known which is called as a phosphor wheel having a substrate formed in a disc shape and a phosphor layer provided on the substrate (see, e.g., Patent Literature 1).

The phosphor wheel described in Patent Literature 1 has a phosphor layer with a film thickness increased by using phosphor having a large particle diameter, uses a phosphor with a low Ce concentration, and is composed only of inorganic materials. By the configuration, high emission intensity is exhibited in high-power applications, performance degradation due to temperature quenching is less likely to occur, and a risk of damage due to excessive heat is reduced.

In addition, in Patent Literature 1, the risk of burnout due to use of resin is mentioned as a problem for a phosphor wheel described in Patent Literature 2 in which phosphor is sealed with a resin, and a phosphor wheel described in Patent Literature 3 in which a phosphor layer and a substrate are joined by a bonding material layer formed of a resin.

CITATION LIST

Patent Literatures

Patent Literature 1: JP 2019/39992 A
Patent Literature 2: JP 2012/8177 A
Patent Literature 3: Japanese Patent No. 6232951

SUMMARY OF INVENTION

Technical Problem

To use the phosphor wheel described in Patent Literature 1 in high-power applications, use of an inorganic material to form the sealing member of the phosphor layer is a requirement as described above and resin cannot be used as the sealing member. On the other hand, resin is advantageous over inorganic materials in that it is low in cost, is relatively resistant to temperature cycle or thermal stress due to its low hardness, and is excellent in light extraction from phosphor due to its lower refractive index than that of the phosphor. Furthermore, since sealing members made of resins are generally formed at a temperature of not more than 150° C. which is lower than formation temperature of sealing members made of inorganic materials, they can be used on, e.g., substrates that are relatively weak against heat, such as high-reflectance substrates using Ag.

It is an object of the invention to provide a wavelength conversion member which has excellent heat conducting properties, can be irradiated with high intensity excitation light to allow high intensity fluorescence to be extracted, and allows a wide range of choices for a material of a sealing member.

Solution to Problem

According to an aspect of the present invention to achieve the above object, a wavelength conversion member defined by (1) to (12) below is provided.

(1) A wavelength conversion member, comprising:
a support; and
a wavelength conversion layer that comprises a phosphor particle group and a sealing member to seal the phosphor particle group and that is provided directly or through an other layer on the support,
wherein a predetermined region, in which a cross-sectional area rate of the phosphor particle group is not less than 50%, is included in an arbitrary cross section of the wavelength conversion layer taken parallel to a thickness direction thereof, and wherein the predetermined region comprises a rectangular region with a width of 700 μm and a thickness of 50 μm from a bottom surface of the wavelength conversion layer when a thickness of the wavelength conversion layer is not less than 50 μm, and the predetermined region comprises a rectangular region with a width of 700 μm and a thickness equal to the thickness of the wavelength conversion layer when the thickness of the wavelength conversion layer is less than 50 μm.

(2) The wavelength conversion member according to (1), wherein the predetermined region comprises not less than two phosphor particle cross sections with the largest length of not less than 40 μm that are cross sections of phosphor particles constituting the phosphor particle group.

(3) The wavelength conversion member according to (1) or (2), wherein the phosphor particle group comprises phosphor particles comprising a plurality of pores therein.

(4) The wavelength conversion member according to any one of (1) to (3), wherein phosphor particles constituting the phosphor particle group comprise single crystal phosphor particles.

(5) The wavelength conversion member according to any one of (1) to (4), wherein the phosphor particle group comprises phosphor particles with curved surfaces.

(6) The wavelength conversion member according to any one of (1) to (5), wherein the sealing member comprises a dimethyl-based silicone resin.

(7) The wavelength conversion member according to any one of (1) to (5), wherein the sealing member mainly comprises a $SiO_2$-based compound.

(8) The wavelength conversion member according to any one of (1) to (7), wherein in addition to the phosphor particle group, an additive having a higher thermal conductivity than the phosphor particles constituting the phosphor particle group is sealed with the sealing member in the wavelength conversion layer.

(9) The wavelength conversion member according to (8), wherein the additive comprises $Al_2O_3$, SiC, diamond (C), AlN, BN, $Si_3N_4$, or MgO.

(10) The wavelength conversion member according to any one of (1) to (9), wherein at least some of the single crystal phosphor particles have a composition within a range represented by a composition formula $(Y_{1-x-y-z}Lu_xGd_yCe_z)_{3+a}Al_{5-a}O_{12}$ ($0 \leq x \leq 0.9994$, $0 \leq y \leq 0.0669$, $0.0002 \leq z \leq 0.0067$, $-0.016 \leq a \leq 0.315$).

(11) The wavelength conversion member according to any one of (1) to (10), comprising a low-refractive-index layer that has a lower refractive index than the sealing member and is provided on the wavelength conversion layer.

(12) The wavelength conversion member according to (11), wherein a thickness of the low-refractive-index layer is not less than 5 μm.

Advantageous Effects of Invention

According to the invention, a wavelength conversion member can be provided which has excellent heat conducting properties, can be irradiated with high intensity excitation light to allow high intensity fluorescence to be extracted, and allows a wide range of choices for a material of a sealing member.

DESCRIPTION OF EMBODIMENTS

First Embodiment

Figure 1:
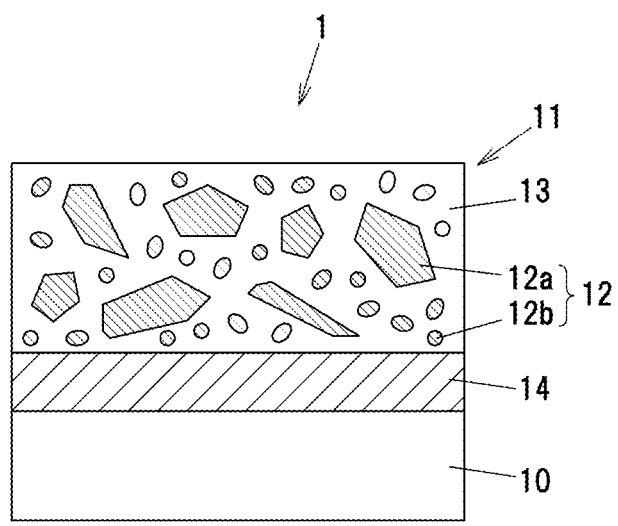
FIG. 1 is a vertical cross-sectional view showing a wavelength conversion member in the first embodiment.

FIG. 1 is a vertical cross-sectional view showing a wavelength conversion member 1 in the first embodiment. The wavelength conversion member 1 includes a substrate 10 as a support, and a wavelength conversion layer 11 that includes a phosphor particle group 12 and a sealing member 13 to seal the phosphor particle group 12 and is provided on the substrate 10 directly or via another layer.

The phosphor particle group 12 absorbs excitation light and generates heat at the time of converting wavelength. To suppress temperature quenching, etc., to obtain high fluorescence intensity, heat conducting properties of the wavelength conversion layer 11 is desired to be increased to effectively release heat generated in the phosphor particle group 12.

As a result of intense study, the present inventors found that increasing a volume rate of the phosphor particle group 12 in the wavelength conversion layer 11 (hereinafter, referred to as Condition 1) is effective to enhance heat conducting properties of the wavelength conversion layer 11 and obtain high fluorescence intensity.

Condition 1 is based on the fact that the higher the volume rate of the phosphor particle group 12 in the wavelength conversion layer 11, the higher the heat transfer coefficient of the wavelength conversion layer 11 since thermal conductivity of the phosphor constituting the phosphor particle group 12 is higher than that of the sealing member 13. Here, the heat transfer coefficient is a parameter indicating how easily heat is transferred from a heat source to adjacent members, and its unit is $W/(m^2 \cdot K)$.

In the case of using, e.g., a YAG-based phosphor to which Ce is added as an activator, thermal conductivity of the phosphor constituting the phosphor particle group 12 at room temperature is 10-13 $W/(m \cdot K)$. Meanwhile, thermal conductivity of the material of the sealing member 13 is, e.g., about 0.1-0.2 $W/(m \cdot K)$ when using a resin material, is up to about 1 $W/(m \cdot K)$ when using glass, and is up to about 10 $W/(m \cdot K)$ when using $SiO_2$. Thermal conductivity of $SiO_2$ is equivalent to that of phosphor but it is difficult to completely fill gaps in the phosphor particle group with $SiO_2$ unlike resin or glass and its effective heat transfer as the sealing member 13 is thus small. In this regard, all the thermal conductivity values described herein are values at room temperature (25° C.).

The present inventors further found that including large-diameter phosphor particles which have not been commonly used (hereinafter, referred to as Condition 2) in addition to Condition 1 is effective to more effectively enhance heat conducting properties of the wavelength conversion layer 11 and obtain high fluorescence intensity.

Condition 2 is based on the fact that when the size of the phosphor is large, a distance of heat transfer in the phosphor, which has a higher thermal conductivity than the sealing member 13 formed of a silicone resin, etc., increases and the heat transfer coefficient of the wavelength conversion layer 11 thereby increases (thermal resistance decreases)

In addition, in case of using large-size phosphors, it is easier to increase a filling rate of phosphor in the wavelength conversion layer 11 and to increase the heat transfer coefficient as the entire wavelength conversion layer 11 when the phosphor particle group 12 is composed of both large-size phosphor and small-size phosphor than when composed of only the large-size phosphor. Therefore, it is preferable to satisfy Condition 2 in addition to Condition 1, rather than satisfying only Condition 2.

As a result of repeated experiments conducted by the present inventors under various conditions, it was found that Condition 1 is satisfied when a predetermined region in which a cross-sectional area rate of the phosphor particle group 12 is not less than 50% (hereinafter, referred to as the calculation region) is included in an arbitrary cross section of the wavelength conversion layer 11 taken parallel to its thickness direction. In addition, when the calculation region in which the cross-sectional area rate of the phosphor particle group 12 is not less than 57% is included in an arbitrary cross section of the wavelength conversion layer 11 taken parallel to the thickness direction, it is possible to further enhance heat conducting properties of the wavelength conversion layer 11 and obtain high fluorescence intensity.

In this regard, if the cross-sectional area rate of the phosphor particle group 12 in an arbitrary cross section of the wavelength conversion layer 11 taken parallel to the thickness direction is too large, it is difficult to adhere the phosphor particle group 12 together by the sealing member 13, hence, the upper limit thereof is set to, e.g., 80%.

Here, the calculation region is a rectangular region with a width of 700 μm and a thickness of 50 μm from a bottom surface of the wavelength conversion layer 11 when the thickness (the smallest thickness when there is a variation) of the wavelength conversion layer 11 is not less than 50 μm, and it is a rectangular region with a width of 700 μm and a thickness equal to the thickness (the smallest thickness when there is a variation) of the wavelength conversion layer 11 when the thickness (the smallest thickness when there is a variation) of the wavelength conversion layer 11 is less than 50 μm.

The reason why the calculation region is a region of the cross section of the wavelength conversion layer 11 taken parallel to the thickness direction is that heat conducting properties of the wavelength conversion layer 11 in the thickness direction are important to efficiently release heat emitted from the phosphor particle group 12 to the substrate 10. In addition, the reason why the calculation region is a region from the bottom surface of the wavelength conversion layer 11 is that heat conducting properties of the region of the wavelength conversion layer 11 continuous with the substrate are important to efficiently release the heat emitted from the phosphor particle group 12 to the substrate 10. In this regard, even if regions not containing the phosphor particle group 12 or regions having an extremely low density of the phosphor particle group 12 are present in an upper portion of the wavelength conversion layer 11, heat generation by the phosphor particle group 12 does not occur or is small in such regions and temperature of the region of the wavelength conversion layer 11 containing the phosphor particle group 12 is thus hardly affected.

Here, the reason why the width of the calculation region is set to 700 μm is as follows. Magnification for scanning electron microscope (SEM) observation was set to 150 times at which particles with a diameter of about 5 μm can be clearly identified and also a certain number of particles can be contained in the field of view. In this case, a suitable width of the region containing a sufficient number of particles is 700 μm.

In addition, the reason why the thickness of the calculation region is set to 50 μm is that the lower limit of a suitable film thickness of the wavelength conversion layer 11 is 50 μm, and a certain thickness from the bottom of the wavelength conversion layer 11 is required to contain a sufficient number of phosphor particles.

The cross-sectional area rate described above can be obtained by SEM image analysis of the cross section of the wavelength conversion layer 11. For example, when an SEM image obtained by SEM observation is binarized, the cross section of the sealing member 13 appears in black and the cross section of the phosphor particle group 12 appears in white. The cross-sectional area rate of the phosphor particle group 12 is obtained as a value of the area rate of the white region to the total area of the white region and the black region. In this regard, due to the nature of SEM, only surfaces of cross sections are observed in SEM observation. Therefore, an average value of the area rate of the phosphor particle group 12 in the entire cross section of the wavelength conversion layer 11 obtained by SEM observation is substantially equal to a volume rate of the phosphor particle group 12 in the wavelength conversion layer 11.

In addition, as a result of the experiments conducted by the present inventors, it was found that Condition 2 is satisfied when the calculation region in an arbitrary cross section of the wavelength conversion layer 11 taken parallel to the thickness direction includes not less than two cross sections of single phosphor particles with the largest length of not less than 40 μm that are cross sections of phosphor particles constituting the phosphor particle group 12. In this regard, when a part of the cross section of one phosphor particle is on a boundary of the calculation region, such a phosphor particle is regarded as being included in the calculation region.

Figure 2:
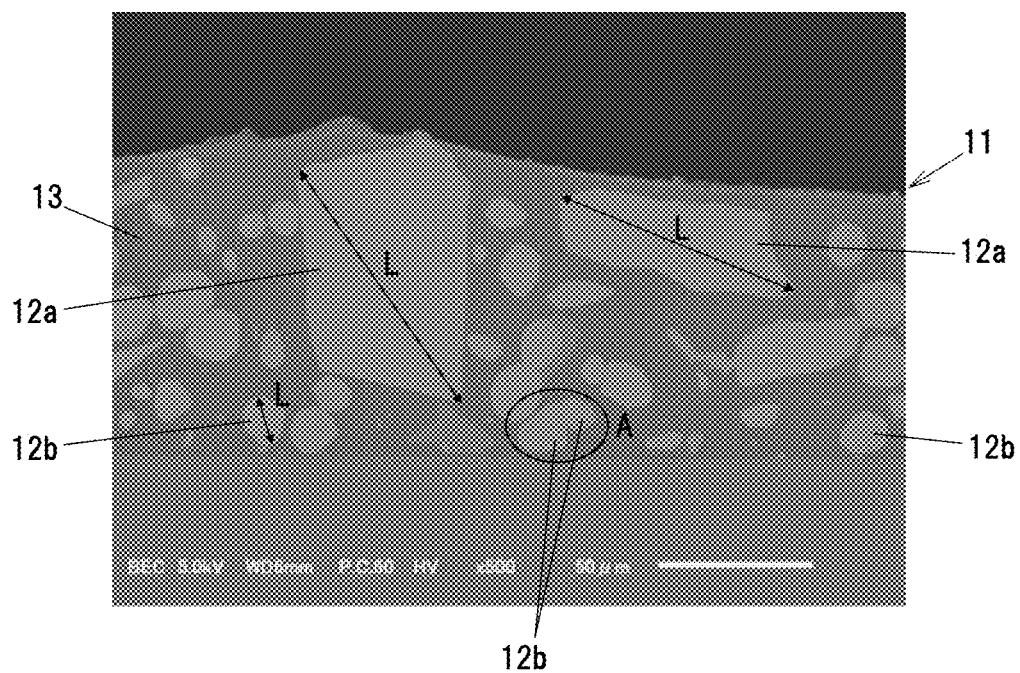
FIG. 2 is a scanning electron microscope (SEM) image showing a vertical-cross section of an example of a wavelength conversion layer.

The phosphor particle group 12 preferably includes large-diameter phosphor particles 12a having cross sections with the largest length of not less than 40 μm provided to satisfy Condition 2, and small-diameter phosphor particles 12b having cross sections with the largest length of not more than 30 μm provided to make it easy to satisfy Condition 1, and is mainly composed of the phosphor particles 12a and the phosphor particles 12b, as shown in FIG. 1 and in FIG. 2 (described later).

The phosphor particles 12a are particles of a single crystal or polycrystalline (ceramic) phosphor. The phosphor particles 12a as the single crystal are, e.g., crushed particles obtained by coarsely crushing a single crystal ingot by a ball mill, etc., and classifying them. The phosphor particles 12a as the polycrystalline are obtained, e.g., by forming polycrystalline particles of not more than 30 μm using solid-phase synthesis, sintering the formed particles (into a ceramic plate) using CIP (Cold Isostatic Pressing) and sintering, HIP (Hot Isostatic Pressing), SPS (Spark Plasma Sintering), etc., then coarsely crushing by a ball mill, etc., and classifying them. The phosphor particles 12a obtained by coarse crushing, both in case of the single crystal and the polycrystal, have a linear and planar feature associated with crushing, and often have cross sections with outer edges composed of straight lines or curves close to straight lines. Single crystal particles here mean that particles do not contain grain boundaries and all particles have the same crystal orientation.

In general, single crystal phosphors often show a smaller decrease in fluorescence intensity with temperature rise than ceramic phosphors (polycrystalline phosphors), hence, the phosphor particles 12a are preferably single crystal phosphor particles. For example, YAG-based single crystal phosphors show a smaller decrease in fluorescence intensity with temperature rise than YAG-based polycrystalline phosphors. The small decrease in fluorescence intensity is due to a small decrease in internal quantum efficiency. A typical YAG-based phosphor is a phosphor of which base crystal is a $Y_3Al_5O_{12}$ (YAG) crystal to which Ce is added as an activator.

The composition of the phosphor particles 12a is not particularly limited, but the phosphor particles 12a are preferably particles of a phosphor excellent in temperature characteristics (capable of maintaining wavelength conversion characteristics even under high temperature conditions), such as YAG-based phosphor. The temperature characteristics of the phosphor particles 12a are important to use the wavelength conversion member 1 in a device using high-intensity laser light as excitation light, such as laser projector.

When the phosphor particles 12a are, e.g., single crystal phosphor particles having a composition within a range represented by a composition formula $(Y_{1-x-y-z}Lu_xGd_yCe_z)_{3+a}Al_{5-a}O_{12}$ (0≤x≤0.9994, 0≤y≤0.0669, 0.0002≤z≤0.0067, −0.016≤a≤0.315), the phosphor particles 12a have excellent characteristics that internal quantum efficiency is not less than 0.95 at a temperature of 25° C. and with excitation light at a peak wavelength of 450 nm, and internal quantum efficiency is not less than 0.90 at a temperature of 300° C. and with excitation light at a peak wavelength of 450 nm.

Thus, it is preferable that at least some of the phosphor particles 12a be single crystal phosphor particles having a composition within a range represented by a composition formula $(Y_{1-x-y-z}Lu_xGd_yCe_z)_{3+a}Al_{5-a}O_{12}$ (0≤x≤0.9994, 0≤y≤0.0669, 0.0002≤z≤0.0067, −0.016≤a≤0.315).

The phosphor particles 12b are particles of a polycrystalline (ceramic) or single crystal phosphor, and in case of ceramic phosphor particles, it is possible to use known common ceramic powder phosphors. The known common ceramic powder phosphors are formed by solid-phase synthesis and it is thus difficult to achieve a particle size of not less than 30 μm. The phosphor particles 12b obtained by synthesis have curved surfaces with fewer corners than the phosphor particles 12a and have cross-sectional shapes close to a circle or oval as compared to the phosphor particles 12a. The curved surfaces of the phosphor particles 12b reduce mutual hooking of particles and thus can increase a packing density of the phosphor particle group 12 in the wavelength conversion layer 11. The high packing density is advantageous for light extraction from the phosphor particle groups 12.

By using the small-diameter phosphor particles 12b in addition to phosphor particles 12a, it is possible to increase a filling rate, i.e., a volume rate, of the phosphor particle group 12 in the wavelength conversion layer 11.

As mentioned above, single-crystal phosphors generally have better temperature characteristics than ceramic phosphors, but need to have a lower concentration of Ce than that in ceramic phosphors to obtain an equivalent color and thus exhibit low excitation light absorption. Therefore, when the phosphor particles 12a are single crystal phosphor particles, use of ceramic phosphor particles as the phosphor particles 12b can compensate for the low absorption of the phosphor particles 12a.

FIG. 2 is a scanning electron microscope (SEM) image showing a vertical-cross section of an example of the wavelength conversion layer 11. The SEM image of FIG. 2 includes cross sections of two phosphor particles 12a and a large number of phosphor particles 12b. Here, the largest length L of the cross section of the phosphor particle 12a, 12b is the largest value of distance between two arbitrary points on the outer edge of the phosphor particle 12a, 12b.

In this regard, an aggregate of integrated plural phosphor particles 12b, such as one included in a region A in FIG. 2, is not counted as a single phosphor particle. That is, even if the largest length of a cross section of the aggregate of the plural phosphor particles 12b is 40 μm, the cross section of such an aggregate does not fall into the category of the cross section of a single phosphor particle with the largest length of not less than 40 μm. The aggregate of the plural phosphor particles 12b often have a narrow portion at a boundary between the phosphor particles 12b, as shown in FIG. 2.

Figure 3:
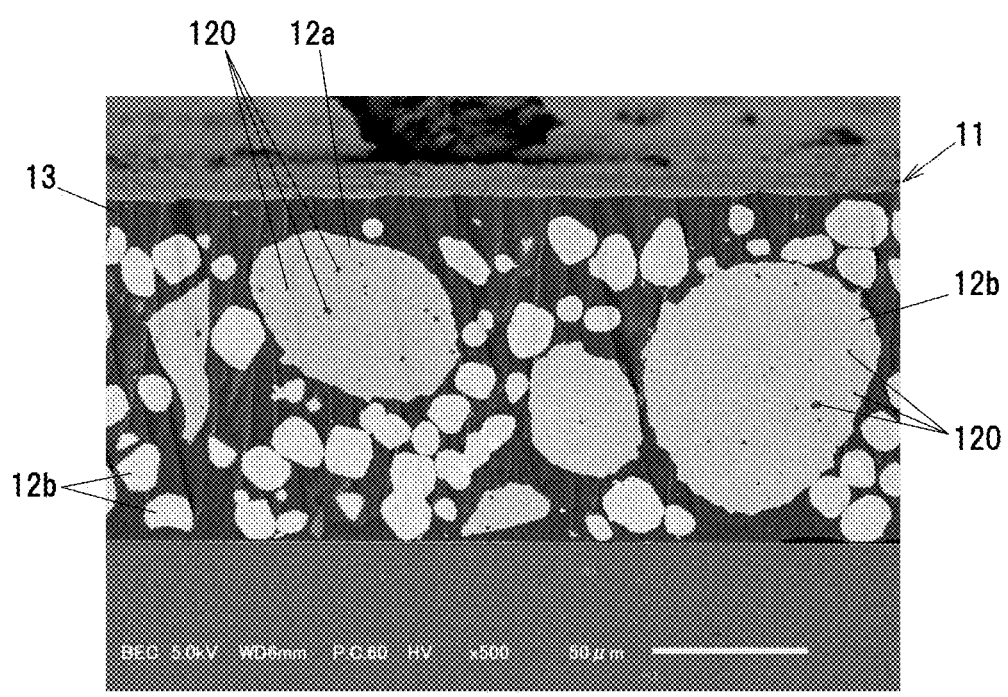
FIG. 3 is an SEM image showing a vertical cross section of another example of the wavelength conversion layer.

FIG. 3 is an SEM image showing a vertical cross section of another example of the wavelength conversion layer 11. The phosphor particles 12a shown in FIG. 3 have curved surfaces with no sharp angle and contains plural pores 120 with a diameter of not more than 5 μm therein. The diameter of the pore here is defined as the largest of lengths of straight lines each connecting two arbitrary points on a perimeter of the pore. As such, the phosphor particles 12a containing the plural pores 120 therein may be included in the phosphor particle group 12. When the pores 120 are present inside the phosphor particles 12a, light entering the phosphor particles 12a or light generated inside the phosphor particles 12a is scattered by the pores 120, hence, the light has more chances to change the direction and escape from the phosphor particles 12a and spreading of light extracted from the wavelength conversion layer 11 can be suppressed. Suppressing the spreading of the light extracted from the wavelength conversion layer 11 allows the light to be efficiently focused by a lens, which increases coupling efficiency with an optical system in a device such as laser projector. In addition, the curved surfaces are advantageous for extraction of fluorescence light generated inside the phosphor particles 12a. The curved surfaces are also advantageous in that mutual hooking of particles is suppressed at the time of forming the wavelength conversion layer 11 and the volume rate is thus easily increased.

The phosphor particles 12a containing the pores 120 therein are formed of a sintered body of single crystal particles and can be manufactured by a method using a single crystal ingot as a raw material or a method using a polycrystalline ceramic as a raw material. Next, an example of the method using a single crystal ingot as a raw material when the phosphor particles 12a are YAG-based phosphor will be described.

Firstly, a single crystal ingot of a phosphor is crushed by a ball mill or a planetary mill so as to have an average particle diameter D50=0.6-5 μm, typically about 1 μm. When the average particle diameter D50 is less than 0.6 μm, the pores 120 are less likely to be generated. On the other hand, when the average particle diameter D50 is more than 5 μm, the crushed single crystal particles are less likely to sinter together and also the size of the pores 120 formed by sintering becomes large. When the size of the pores 120 is large, heat conducting properties of the wavelength conversion layer 11 decrease due to a decrease in the density of the phosphor particles 12a and there is also a possibility that light is less likely to be scattered, hence, the size of the pores 120 is preferably not more than 5 μm.

Next, heat treatment is performed to sinter the crushed single crystal particles together. The heat treatment is preferably performed in an inert gas atmosphere, i.e., in an Ar atmosphere. This heat treatment is performed at high temperature. Therefore, when a reducing atmosphere such as hydrogen or a mixed gas of hydrogen and nitrogen is used, the YAG-based phosphor which is an oxide phosphor is degraded by reduction and internal quantum efficiency decreases. When a nitrogen atmosphere is used, the YAG-based phosphor which is an oxide phosphor is degraded by nitriding reaction and internal quantum efficiency decreases in the similar manner. Furthermore, when an oxygen atmosphere is used, the valence of Ce ions acting as activator changes from trivalent to partially tetravalent and this also causes a decrease in internal quantum efficiency.

Heat treatment temperature is about 1450-1750° C., and is typically 1600° C. Heat treatment time is about 1-12 hours, and is typically 5 hours. When the heat treatment temperature is less than 1450° C. or when the heat treatment time is less than 1 hour, sintering may not sufficiently progress. Meanwhile, when the heat treatment temperature is more than 1750° C. or when the heat treatment time is more than 12 hours, a physical force required for crushing (described later) increases due to too high degree of sintering and there is concern that internal quantum efficiency may decrease due to damage caused by crushing. In addition, when the heat treatment temperature is high, it causes a problem of increase in the cost of equipment and the process cost.

Next, the sintered body of the single crystal particles obtained by the heat treatment is disaggregated (the particles weakly adhered by heat are broken up) by a known method and classified. Then, large-diameter sintered single crystal particles having cross sections with the largest length of not less than 40 μm, which are sorted by classification, are used as the phosphor particle 12a. In this regard, if the internal quantum efficiency of the phosphor particles 12a decreases due to disaggregation, it can be recovered by performing heat treatment in an Ar atmosphere.

The sealing member 13 is formed of a transparent resin (organic material) or a transparent inorganic material. Resin, when used as the material of the sealing member 13, is advantageous over inorganic materials in that it is low in cost, is relatively resistant to temperature cycle or thermal stress due to its low hardness, and is excellent in light extraction from phosphor due to its lower refractive index than that of the phosphor. Furthermore, since sealing members made of resins are generally formed at a temperature of not more than 150° C. which is lower than formation temperature of sealing members made of inorganic materials, they can be used without problems even when, e.g., the substrate 10 is a substrate that is relatively weak against heat, such as high-reflectance substrate using Ag. On the other hand, an inorganic material, when used as the material of the sealing member 13, is advantageous over the resin in that heat resistance is excellent.

Resins used as the material of the sealing member 13 include an acrylic-based resin, an epoxy-based resin, a silicone-based resin (a phenyl-based silicone resin, a dimethyl-based silicone resin), etc. Among these resins, particularly a dimethyl-based silicone resin is excellent in heat resistance and is preferable as the material for sealing member 13.

Inorganic materials used as the material of the sealing member 13 include low-melting-point glass, $SiO_2$-based compounds, $Al_2O_3$-based compounds, SOG (spin-on glass), etc. Among these inorganic materials, the $SiO_2$-based compounds can be synthesized at low temperatures by the sol-gel method, etc., and their simple components provide excellent long-term reliability and easy handling. Therefore, the sealing member 13 formed of an inorganic material is preferably mainly composed of an $SiO_2$-based compound.

The wavelength conversion member 1 can have high heat conducting properties due to the configuration of the phosphor particle group 12, as described above. Therefore, it is possible to suppress thermal degradation of the sealing member 13 and resulting damage on the wavelength conversion member 1 even when a resin is used as the material of the sealing member 13 and it is irradiated with high intensity excitation light in applications such as projector.

In addition, since the wavelength conversion member 1 can have high heat conducting properties due to the configuration of the phosphor particle group 12 as described above, heat conducting properties of the wavelength conversion member 1 is less affected by thermal conductivity of the sealing member 13.

The material of the substrate 10 is not specifically limited, but it is preferable to use Al which has high thermal conductivity and is relatively inexpensive. When the wavelength conversion member 1 is used as a transmission type wavelength conversion member in an applied device, it is desirable that sapphire having high transmittance to visible light and relatively high thermal conductivity be used as the material of the substrate 10. Alternatively, a non-plate-shaped support may be used in place of the substrate 10.

In addition, the wavelength conversion member 1 preferably has a high-reflectance layer 14 between the substrate 10 and the wavelength conversion layer 11, as shown in FIG. 1. The high-reflectance layer 14 has a higher reflectance than the substrate 10. When the substrate 10 is formed of, e.g., Al, an average reflectance is only in the low 90% range for visible light with wavelengths from 440 nm (blue) to 730 nm (red) and it is thus preferable to use the high-reflectance layer 14.

Figure 4A:
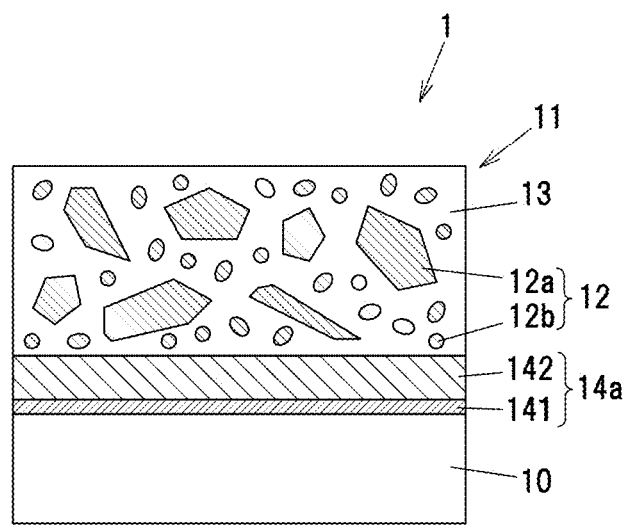
FIG. 4A is a vertical cross-sectional view showing a configuration example of a high-reflectance layer.
Figure 4B:
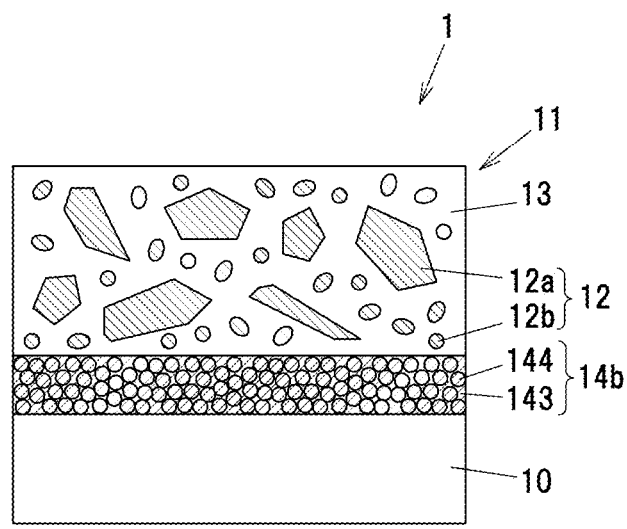
FIG. 4B is a vertical cross-sectional view showing another configuration example of the high-reflectance layer.

FIGS. 4A and 4B are vertical cross-sectional views showing configuration examples of the high-reflectance layer 14. The high-reflectance layer 14 shown in FIG. 4A (referred to as a high-reflectance layer 14a) has an Ag-based film 141 formed of Ag or an Ag-based alloy having a higher reflectance than Al, and a protective film 142 to prevent blackening of the Ag-based film 141 due to sulfurization.

The average reflectance of the Ag-based film 141 to visible light is about 98-99%. The protective film 142 is formed of an insulating material (dielectric) transparent to visible light, such as $Al_2O_3$, $SiO_2$, $TiO_2$. The protective film 142 has a higher reflectance when a dielectric multilayer film formed by stacking different dielectric films is used as the protective film 142, and reflectance of the high-reflectance layer 14 can be thereby further increased.

The high-reflectance layer 14 shown in FIG. 4B (referred to as a high-reflectance layer 14b) has a low-refractive-index resin 143 formed of a resin with a low refractive index such as a fluoride-based silicone resin (a refractive index n=about 1.36), and high-refractive-index particles 144 contained in the low-refractive-index resin 143. The high-reflectance layer 14b has the advantage of being manufactured at lower cost than the high-reflectance layer 14a having the Ag-based film 141.

To suppress light absorption in the high-reflectance layer 14b, particles with high transmittance to visible light (e.g., light with a wavelength of 440-730 nm) are used as the high-refractive-index particles 144. In addition, since light is scattered at interfaces between the high-refractive-index particles 144 and the low-refractive-index resin 143 between which there is a difference in refractive index, the high-refractive-index particles 144 preferably have a large specific surface area relative to the total volume. Thus, the high-refractive-index particles 144 are preferably fine spherical particles with a particle diameter of about 1-5 μm. When fine particles are used as the high-refractive-index particles 144, the blending amount of the high-refractive-index particles 144 is adjusted so that the volume rate of the high-refractive-index particles 144 in the high-reflectance layer 14b does not decrease.

The high-refractive-index particles 144 are formed of, e.g., $Al_2O_3$, SiC, diamond (C), AlN, BN, $Si_3N_4$, or MgO. As the material of the high-refractive-index particles 144, it is particularly preferable to use a material which has relatively high thermal conductivity to efficiently release heat generated in the wavelength conversion member 1 to the substrate 10, also has high transmittance and is furthermore easily available at low cost, such as $Al_2O_3$, etc.

As the material of the low-refractive-index resin 143, it is possible to use, e.g., the same material as that of the sealing member 13, such as dimethyl-based silicone resin (a refractive index of about 1.41).

In addition, since light scattering at the interfaces between the low-refractive-index resin 143 and the high-refractive-index particles 144 is larger when the refractive index difference between the low-refractive-index resin 143 and the high-refractive-index particles 144 is larger, it is preferable that a material having a low refractive index such as a fluorine resin (a refractive index of about 1.35) or a fluoride-based silicone resin (a refractive index of about 1.36) be used as the material of the low-refractive-index resin 143. When a fluorine resin or a fluoride-based silicone resin is used as the material of the low-refractive-index resin 143, $SiO_2$ with a relatively low refractive index (a refractive index of about 1.46) can be also used as the material of the high-refractive-index particles 144, which expands the range of choices for the material of the high-refractive-index particles 144.

To produce as much light scattering as possible and also to improve heat transfer characteristics, the high-reflectance layer 14b is desirably as thin as possible (the film thickness of 10-30 µm) and has higher thermal conductivity. Thus, the most preferred combination of the material of the low-refractive-index resin 143 and the material of the high-refractive-index particles 144 is a combination of a fluorine-based resin and $Al_2O_3$.

Figure 5:
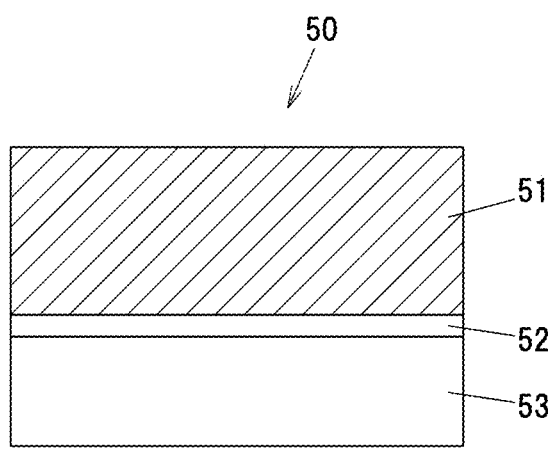
FIG. 5 is a vertical cross-sectional view showing a wavelength conversion member as a known example in which a wavelength conversion layer formed of YAG ceramic is fixed to a substrate by a silicone resin.

FIGS. 5 to 7 are schematic diagrams for explaining thermal resistance of a known general wavelength conversion layer and the wavelength conversion layer 11.

FIG. 5 is a vertical cross-sectional view showing a wavelength conversion member 50 as a known example in which a wavelength conversion layer 51 formed of YAG ceramic is fixed to a substrate 53 by a silicone resin 52. Let assume that the wavelength conversion layer 51 has a thermal conductivity of 10 W/(m·K), a thickness of 200 µm and a thermal resistance of 1 (a reference for thermal resistances of the other members). Given that the silicone resin 52 has a thermal conductivity of 0.2 W/(m·K) and a thickness of 20 µm, thermal resistance of the silicone resin 52 normalized by the thermal resistance of the wavelength conversion layer 51 (a value of a ratio of its thermal resistance to the thermal resistance of the wavelength conversion layer 51) is 5.0. Therefore, a combined thermal resistance of the wavelength conversion layer 51 and the silicone resin 52 normalized by the thermal resistance of the wavelength conversion layer 51 is 6.0.

Figure 6A:
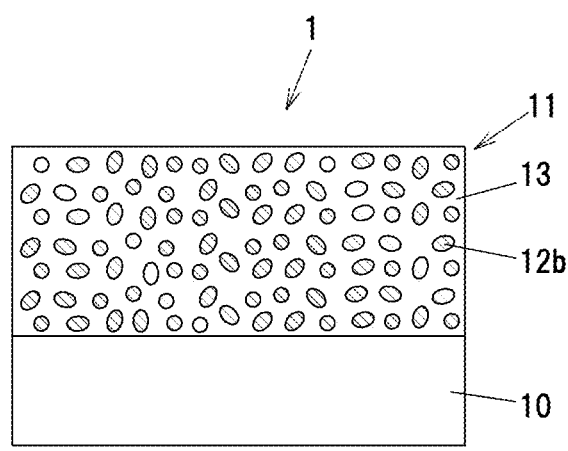
FIG. 6A is a vertical cross-sectional view showing a wavelength conversion member in which a wavelength conversion layer having phosphor particles composed of YAG powder and a sealing member formed of a silicone resin is fixed to a substrate.
Figure 6B:
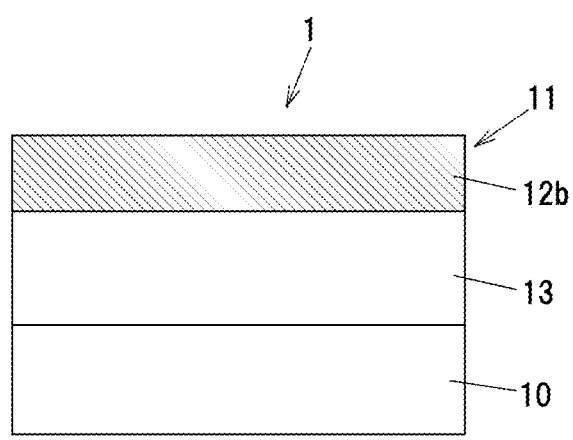
FIG. 6B is a diagram illustrating a modeled thermal structure of the wavelength conversion member in FIG. 6A.

FIG. 6A is a vertical cross-sectional view showing the wavelength conversion member 1 in which the wavelength conversion layer 11 having the phosphor particles 12b composed of YAG powder and the sealing member 13 formed of a silicone resin is fixed to the substrate 10. The thickness of the wavelength conversion layer 11 is 100 µm, and the volume rate of the phosphor particles 12b to the sealing member is 40:60. FIG. 6B is a thermal structure of the wavelength conversion member 1 which is modeled to simplify evaluation of the thermal resistance of the wavelength conversion layer 11 shown in FIG. 6A and can be regarded as a thermal series resistance circuit.

The thickness of the phosphor particles 12b modeled in the form of a film is 40 µm, and its thermal resistance normalized by the thermal resistance of the wavelength conversion layer 51 is 0.2. Meanwhile, the thickness of the modeled sealing member 13 is 60 µm, and its thermal resistance standardized by the thermal resistance of the wavelength conversion layer 51 is 15.0. Therefore, a combined thermal resistance of the phosphor particles 12b and the sealing member 13, i.e., the thermal resistance of the wavelength conversion layer 11, standardized by the thermal resistance of the wavelength conversion layer 51 is 15.2.

Figure 7A:
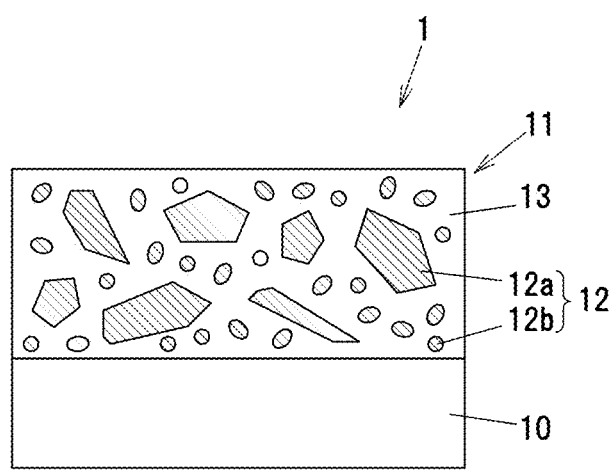
FIG. 7A is a vertical cross-sectional view showing a wavelength conversion member in which a wavelength conversion layer having large-diameter phosphor particles, small-diameter phosphor particles and a sealing member formed of a silicone resin is fixed to a substrate.
Figure 7B:
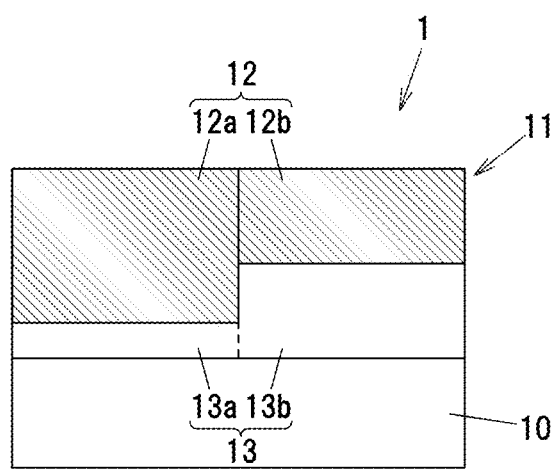
FIG. 7B is a diagram illustrating a modeled thermal structure of the wavelength conversion member in FIG. 7A.

FIG. 7A is a vertical cross-sectional view showing the wavelength conversion member 1 in which the wavelength conversion layer 11 having the phosphor particles 12a, the phosphor particles 12b and the sealing member 13 formed of a silicone resin is fixed to the substrate 10. The thickness of the wavelength conversion layer 11 is 80 µm, and a phosphor rate is to 65%. FIG. 7B is a thermal structure of the wavelength conversion member 1 which is modeled to simplify evaluation of the thermal resistance of the wavelength conversion layer 11 and can be regarded as a combined resistance circuit in which two thermal series resistance circuits are arranged in parallel.

The thickness of the phosphor particles 12a modeled in the form of a block is 65 µm, and its thermal resistance normalized by the thermal resistance of the wavelength conversion layer 51 is 0.325×2. The thickness of the phosphor particles 12b modeled in the form of a block is 40 µm, and its thermal resistance normalized by the thermal resistance of the wavelength conversion layer 51 is 0.2×2. Meanwhile, the thicknesses of modeled sealing members 13a, 13b are respectively 15 µm and 40 µm, and their thermal resistances standardized by the thermal resistance of the wavelength conversion layer 51 are respectively 3.75×2 and 10×2. Therefore, a combined thermal resistance of the phosphor particles 12a, the phosphor particles 12b and the sealing member 13, i.e., the thermal resistance of the wavelength conversion layer 11, standardized by the thermal resistance of the wavelength conversion layer 51 is 5.82. This shows that the wavelength conversion layer 11 has thermal characteristics comparable to those of the wavelength conversion layer 51 formed of YAG ceramic and fixed to the substrate 53 by the silicone resin 52. One of the differences from the wavelength conversion member 1 shown in FIG. 6 is the higher density of the phosphor particle group, and another is a heat bypass effect by the large-size phosphor particles 12a.

Figure 8:
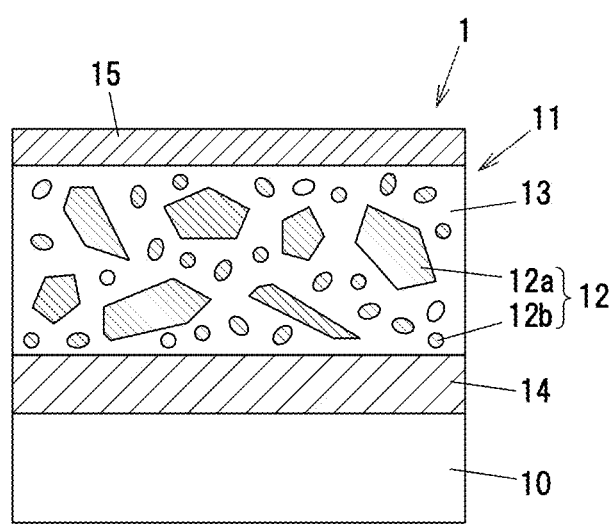
FIG. 8 is a vertical cross-sectional view showing a modification of the wavelength conversion member in the first embodiment.

FIG. 8 is a vertical cross-sectional view showing a modification of the wavelength conversion member 1. In this modification, a low-refractive-index resin film 15 having a lower refractive index than that of the sealing member 13 is provided on the wavelength conversion layer 11. The low-refractive-index resin film 15 is formed of, e.g., a low-refractive-index resin such as fluorine resin or fluoride-based silicone resin. Light extraction efficiency from the wavelength conversion member 1 can be improved by using the low-refractive-index resin film 15.

To improve the light extraction efficiency of the wavelength conversion member 1, a thickness of the low-refractive-index resin film 15 is preferably not less than 5 µm and not more than 30 µm. The thickness of the low-refractive-index resin film 15 should be at least 5 µm on average, and the light extraction efficiency does not decrease even if locally thin portions are present due to local irregularities of the surface. When thicker than 30 µm, there is substantially no thermal influence, but light spreads wider and thus has a lower coupling efficiency with an optical system. The low-refractive-index resin film 15 does not contain phosphors.

Figure 9:
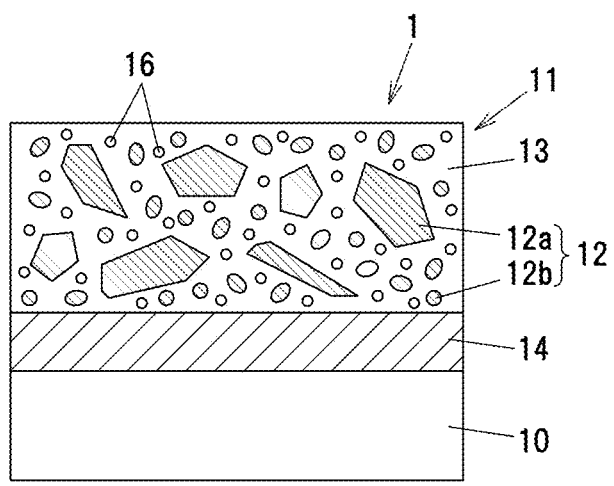
FIG. 9 is a vertical cross-sectional view showing another modification of the wavelength conversion member in the first embodiment.

FIG. 9 is a vertical cross-sectional view showing another modification of the wavelength conversion member 1. In this modification, in addition to the phosphor particle group 12, a particulate additive 16 is sealed with the sealing member 13 in the wavelength conversion layer 11.

The additive 16 has a higher thermal conductivity than the phosphor particles 12a, 12b constituting the phosphor particle group 12. Therefore, heat conducting properties of the wavelength conversion layer 11 can be improved by using the additive 16.

The additive 16 is formed of, e.g., $Al_2O_3$, SiC, diamond (C), AlN, BN, $Si_3N_4$, or MgO. Here, thermal conductivity of $Al_2O_3$ is about 41 W/(m·K), thermal conductivity of SiC is about 200 W/(m·K), thermal conductivity of diamond is about 1000-2000 W/(m·K), thermal conductivity of MN is about 70-270 W/(m·K), thermal conductivity of BN is about 60-200 W/(m·K), thermal conductivity of $Si_3N_4$ is about 30-80 W/(m·K), and thermal conductivity of MgO is about 40 W/(m·K). Meanwhile, thermal conductivity of YAG phosphor as a representative example of the phosphor particle group 12 is about 10-13 W/(m·K).

In this regard, however, when the added amount of the additive 16 is too large, the density of the phosphor particle group 12 in the wavelength conversion layer 11 deceases proportionally. Therefore, the volume of additive 16 is preferably not more than 20% of the volume of the phosphor particle group 12.

In addition, to suppress light absorption by the additive 16, the additive 16 preferably has a higher transmittance for visible light, particularly light with a wavelength of 440-730 nm, than the phosphor particles 12a, 12b constituting the phosphor particle group 12. In addition, to enhance light scattering of excitation light or fluorescence, the additive 16 preferably has a higher refractive index than that of the phosphor particles 12a, 12b constituting the phosphor particle group 12.

Figure 10A:
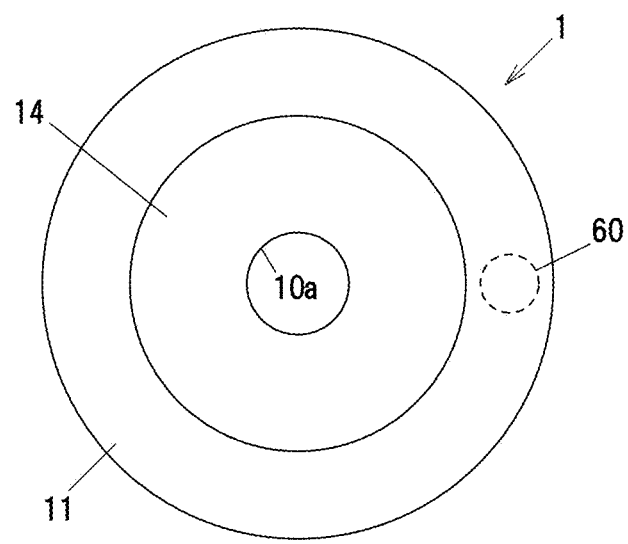
FIG. 10A is a plan view showing the wavelength conversion member in the first embodiment when it is a phosphor wheel used in a laser projector.
Figure 10B:
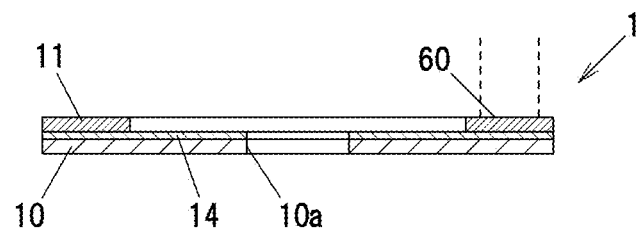
FIG. 10B is a cross-sectional view showing the wavelength conversion member in the first embodiment when it is a phosphor wheel used in the laser projector.

FIGS. 10A and 10B are a plan view and a cross-sectional view showing the wavelength conversion member 1 when it is a disc-shaped member called a phosphor wheel used in a laser projector. The wavelength conversion member 1 is configured such that the substrate 10 has a disc shape, and the high-reflectance layer 14 and the wavelength conversion layer 11, which have annular shapes, are provided along the outer periphery thereof. The annular wavelength conversion layer 11 has, e.g., a width of 3-7 mm and a thickness of 50-250 μm.

The substrate 10 has a hole 10a for passing a shaft of a motor that rotates the wavelength conversion member 1, and the wavelength conversion member 1 is placed in the laser projector so that it can be rotated in its circumferential direction by the motor.

During the operation of the laser projector, an irradiation position 60 to be irradiated with light emitted from an excitation light source such as laser diode can be continuously changed by rotating the wavelength conversion member 1 at, e.g., 7200 revolutions per minute and this allows temperature rise of the wavelength conversion layer 11 to be suppressed, hence, it is possible to maintain high fluorescence intensity under high laser power conditions. In addition, by increasing a diameter of the phosphor wheel, an average intensity of laser received by the phosphor to be irradiated with the laser is reduced and temperature rise of the phosphor can be suppressed.

In addition, although the wavelength conversion members 1 shown in FIGS. 1, 4, 8 and 9 are reflection type wavelength conversion members configured to extract fluorescence on the excitation light source side, the wavelength conversion member 1 may be a transmission type wavelength conversion member configured to extract fluorescence on a side opposite to the excitation light source. In this case, a transparent substrate such as sapphire substrate is used as the substrate 10, and a layer which reflects light, such as the high-reflectance layer 14, is not used.

Second Embodiment

The wavelength conversion member of the second embodiment of the invention is different from the wavelength conversion member of the first embodiment in the configuration of the wavelength conversion layer. The explanation will be omitted or simplified for the same features as those in the first embodiment, such as the configuration of the members other than the wavelength conversion layer.

Figure 11:
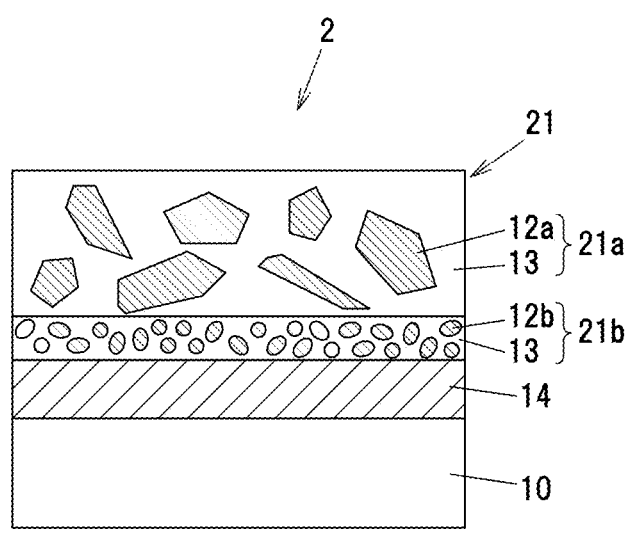
FIG. 11 is a vertical cross-sectional view showing the wavelength conversion member in the second embodiment.

FIG. 11 is a vertical cross-sectional view showing a wavelength conversion member 2 in the second embodiment. The wavelength conversion member 2 includes the substrate 10, and a wavelength conversion layer 21 that is provided above the substrate 10 and includes a lower layer 21b including the phosphor particles 12b and the sealing member 13 sealing them, and an upper layer 21a provided on the lower layer 21b and including the phosphor particles 12a and the sealing member 13 sealing them.

The wavelength conversion member 2 also preferably has the high-reflectance layer 14 between the substrate 10 and the wavelength conversion layer 21, in the same manner as the wavelength conversion member 1.

The wavelength conversion layer 21 of the wavelength conversion member 2 is divided into a layer containing the large-diameter phosphor particles 12a and a layer containing the small-diameter phosphor particles 12b and is thus favorable when using plural phosphors with different chromaticity or when using plural phosphors having different temperature characteristics of wavelength conversion efficiency. Particularly in the case of using plural phosphors having different temperature characteristics, it is possible to realize higher wavelength conversion efficiency when arranging a phosphor with good temperature characteristics on the upper layer side where excitation light intensity is strong and temperature is likely to rise, and a phosphor with poor temperature characteristics on the lower layer side with weak intensity, as compared to when the two types are mixed and used in one layer. In addition, since temperature characteristics of wavelength conversion efficiency is generally poorer in red phosphors than in green or yellow phosphors, it is preferable to place a red phosphor (with relatively high CIE chromaticity x) on the lower layer side and a green or yellow phosphor (with relatively low CIE chromaticity x) on the upper layer side. The same applies to when using two types of phosphors, a green phosphor and a yellow phosphor (the phosphor with relatively high CIE chromaticity x is arranged on the lower layer side and the phosphor with low x on the upper layer side).

Effects of the Embodiments

In the first and second embodiments, by using the wavelength conversion layer 11 which satisfies Condition 1, preferably, Condition 1 and Condition 2 described above, it is possible to provide the wavelength conversion members 1, 2 which have excellent heat conducting properties and can be irradiated with high intensity excitation light to allow high intensity fluorescence to be extracted. In addition, since the excellent heat conducting properties of the wavelength conversion members 1 and 2 are obtained by Condition 1 and Condition 2 related to the configuration of the phosphor particle group 12 and are less affected by the heat conducting properties of the sealing member 13, various materials can be used to form the sealing member 13. In other words, there is a wide range of choices for the material of the sealing material 13.

In addition, the wavelength conversion members 1 and 2 have excellent heat conducting properties and thus can be suitably used in a device using high-intensity laser light as excitation light, such as laser projector.

With laser projectors available on the market, high light utilization efficiency is directly related to outcome and value, and various techniques to improve light utilization efficiency in 1% increments have been developed over and over again. Here, light utilization efficiency of the laser projector is proportional to wavelength conversion efficiency (absorption×internal quantum efficiency×light extraction efficiency from the particles), light extraction efficiency from the wavelength conversion layer, and coupling efficiency with a light collection optical system.

Thus, to further increase the light utilization efficiency when used in, e.g., a laser projector, it is preferable that the low-refractive-index resin film 15 be used as shown in FIG. 8 to increase light extraction efficiency from the wavelength conversion layer 11, and the phosphor particle group 12 including the phosphor particles containing the plural pores 120 therein as shown in FIG. 3 be used to suppress spreading of extracted light and enhance coupling efficiency with the light collection optical system such as lens or optical fiber.

Although the first and second embodiments have been described using mainly YAG-based phosphor or LuAG-based phosphor as an example of the phosphor constituting the phosphor particle group 12, the same effects can be obtained even when another phosphor such as other garnet-based phosphors or other phosphors, e.g., SiAlON-based phosphors such as SiAlON or CASN-based phosphors such as $CaAlSiN_3$ is used as the phosphor constituting the phosphor particle group 12.

Example 1

Figure 12:
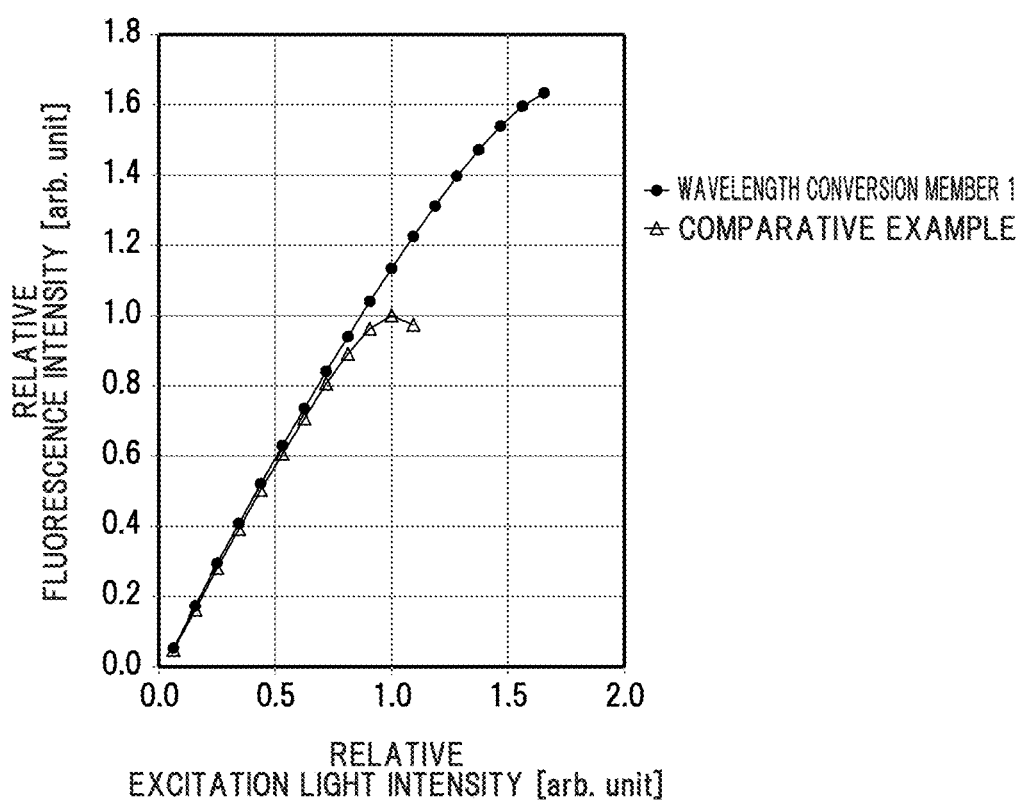
FIG. 12 is a graph showing an example of wavelength conversion characteristics of a wavelength conversion member in Example 1 and a wavelength conversion member in Comparative Example.

FIG. 12 is a graph showing an example of wavelength conversion characteristics of the wavelength conversion member 1 in the first embodiment (a sample H described later) and a wavelength conversion member as Comparative Example in which the cross-sectional area rate of the phosphor particle group 12 is less than 50%. Here, the wavelength conversion member 1 and the wavelength conversion member in Comparative Example are phosphor wheels having the same wheel diameter, and measurements were conducted using an optical evaluation setup 30 for laser projector shown in FIG. 23 (described later). The horizontal axis of the graph in FIG. 12 indicates excitation light intensity which is normalized by excitation light intensity when fluorescence intensity of the wavelength conversion member in Comparative Example reached saturation (the excitation light intensity at that time was set to 1). The vertical axis indicates fluorescence intensity which is normalized by fluorescence intensity when the fluorescence intensity of the wavelength conversion member in Comparative Example reached saturation (the fluorescence intensity at that time was set to 1).

Here, diameters of the phosphor wheels subjected to evaluation (the wavelength conversion member 1 and the wavelength conversion member in Comparative Example) are about 30 mm, and a spot size of the excitation light (full width at half maximum) is 0.86 mm. The rotation speed of the phosphor wheels is 7200 revolutions per minute. Thicknesses of the wavelength conversion layers 11 of the wavelength conversion member 1 and the wavelength conversion member in Comparative Example are about 100 μm.

As a result of measurement conducted on the wavelength conversion member 1 which is the sample H, the cross-sectional area rate of the phosphor particle group 12 in two cross sections parallel to the thickness direction was 54.3% and 54.5%, as will be described later. In addition, the number of phosphor particle cross sections with the largest length of not less than 40 μm contained in those two cross sections parallel to the thickness direction was 6 and 8.

Figure 13A:
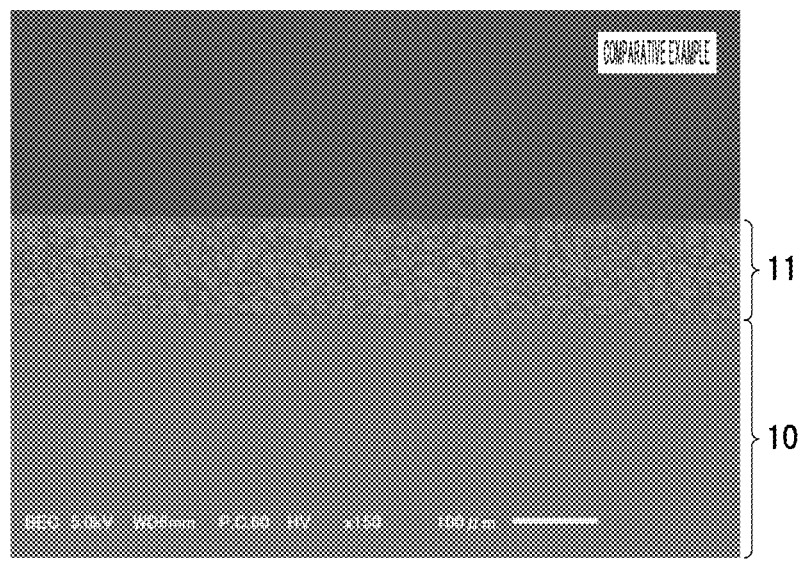
FIG. 13A is an SEM photograph showing a cross section of the wavelength conversion member in Comparative Example taken parallel to a thickness direction thereof.
Figure 13B:
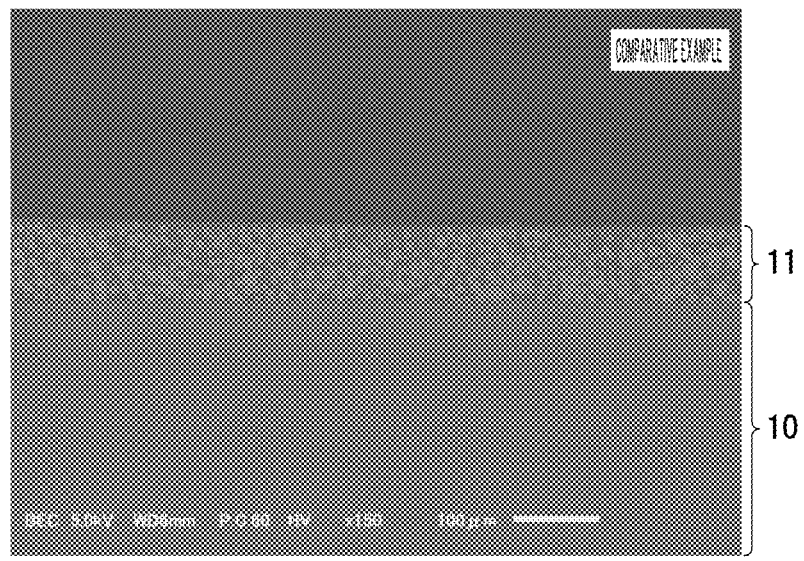
FIG. 13B is an SEM photograph showing another cross section of the wavelength conversion member in Comparative Example taken parallel to the thickness direction thereof.
Figure 13C:
FIG. 13C is a binarized image showing a calculation region which is cut out from the cross section of the wavelength conversion layer shown in FIG. 13A.
Figure 13D:
FIG. 13D is a binarized image showing the calculation region which is cut out from the cross section of the wavelength conversion layer shown in FIG. 13B.
Figure 14A:
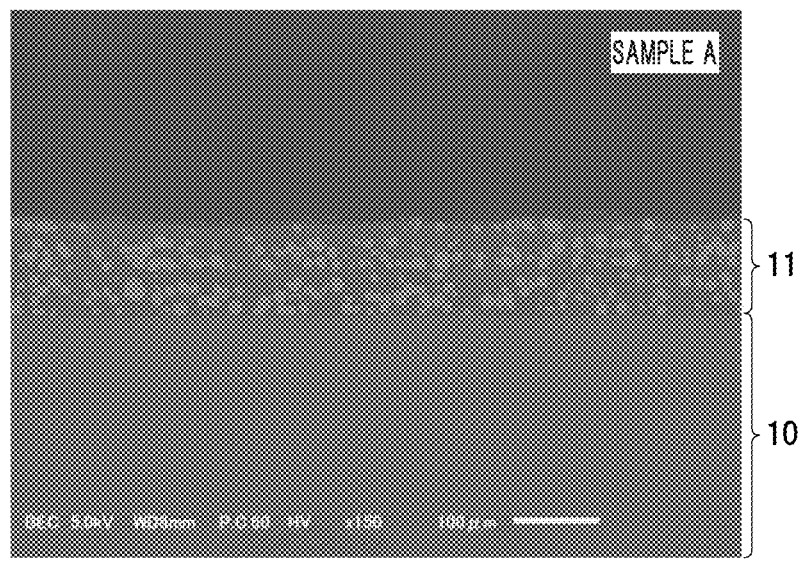
FIG. 14A is an SEM photograph showing a cross section of a sample A in Example 2.
Figure 14B:
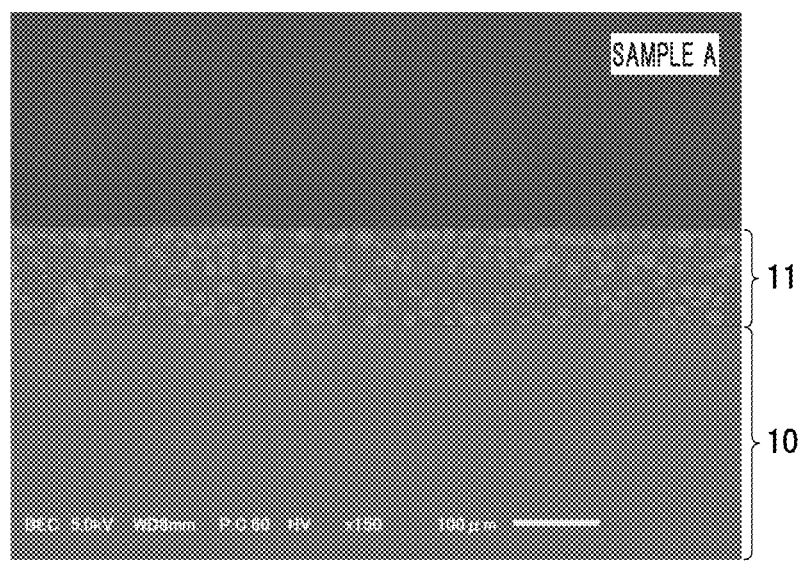
FIG. 14B is an SEM photograph showing another cross section of the sample A in Example 2.
Figure 14C:
FIG. 14C is a binarized image showing the calculation region which is cut out from the cross section of the wavelength conversion layer shown in FIG. 14A.
Figure 14D:
FIG. 14D is a binarized image showing the calculation region which is cut out from the cross section of the wavelength conversion layer shown in FIG. 14B.
Figure 15A:
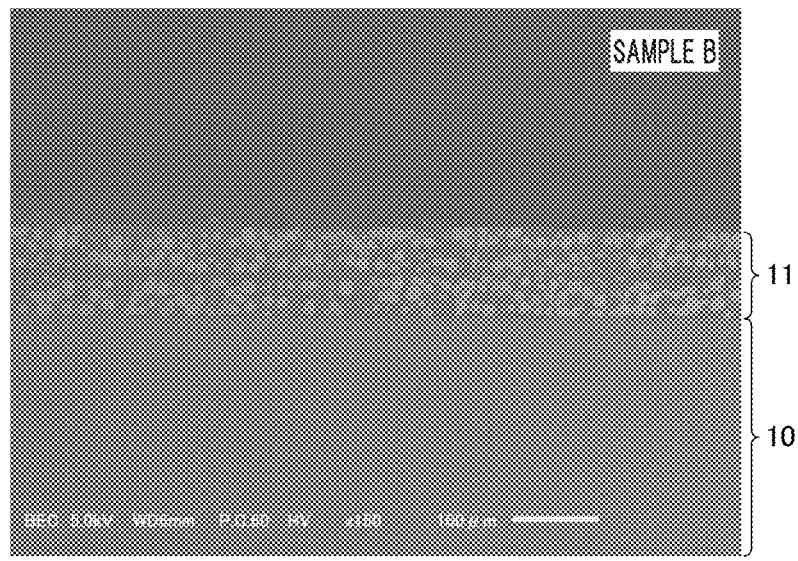
FIG. 15A is an SEM photograph showing a cross section of a sample B in Example 2.
Figure 15B:
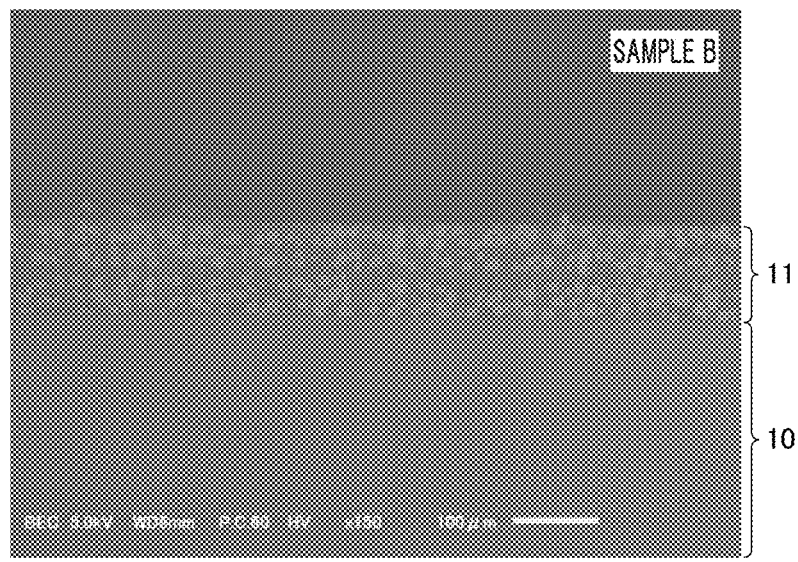
FIG. 15B is an SEM photograph showing another cross section of the sample B in Example 2.
Figure 15C:
FIG. 15C is a binarized image showing the calculation region which is cut out from the cross section of the wavelength conversion layer shown in FIG. 15A.
Figure 15D:
FIG. 15D is a binarized image showing the calculation region which is cut out from the cross section of the wavelength conversion layer shown in FIG. 15B.
Figure 16A:
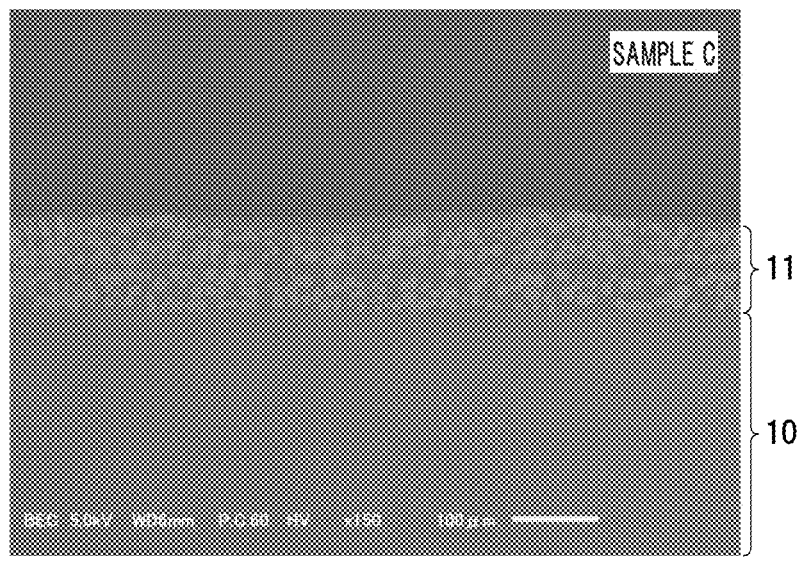
FIG. 16A is an SEM photograph showing a cross section of a sample C in Example 2.
Figure 16B:
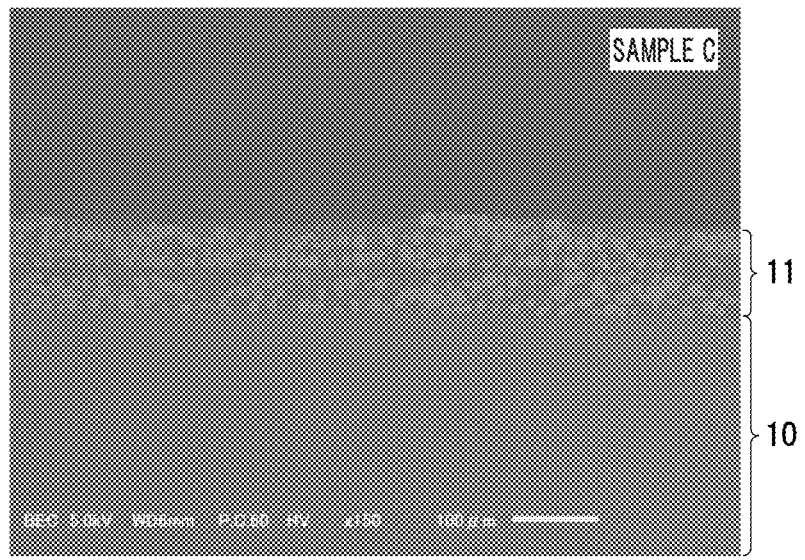
FIG. 16B is an SEM photograph showing another cross section of the sample C in Example 2.
Figure 16C:
FIG. 16C is a binarized image showing the calculation region which is cut out from the cross section of the wavelength conversion layer shown in FIG. 16A.
Figure 16D:
FIG. 16D is a binarized image showing the calculation region which is cut out from the cross section of the wavelength conversion layer shown in FIG. 16B.
Figure 17A:
FIG. 17A is an SEM photograph showing a cross section of a sample D in Example 2.
Figure 17B:
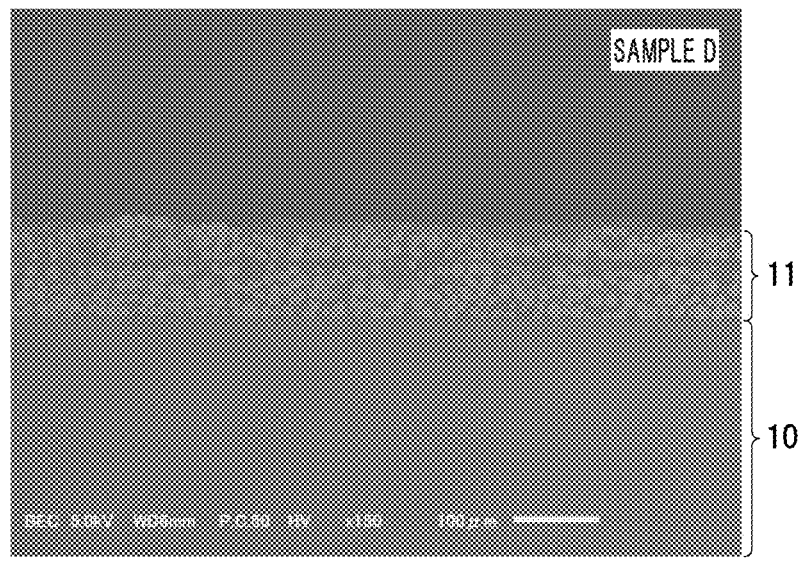
FIG. 17B is an SEM photograph showing another cross section of the sample D in Example 2.
Figure 17C:
FIG. 17C is a binarized image showing the calculation region which is cut out from the cross section of the wavelength conversion layer shown in FIG. 17A.
Figure 17D:
FIG. 17D is a binarized image showing the calculation region which is cut out from the cross section of the wavelength conversion layer shown in FIG. 17B.
Figure 18A:
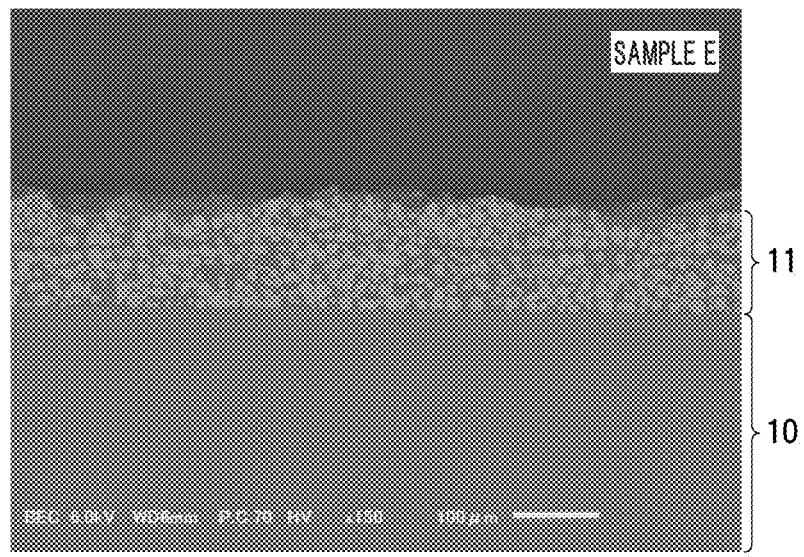
FIG. 18A is an SEM photograph showing a cross section of a sample E in Example 2.
Figure 18B:
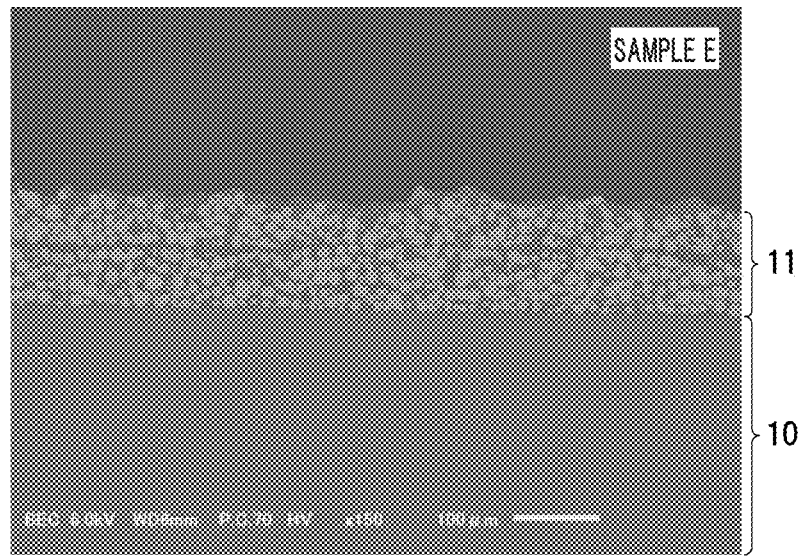
FIG. 18B is an SEM photograph showing another cross section of the sample E in Example 2.
Figure 18C:
FIG. 18C is a binarized image showing the calculation region which is cut out from the cross section of the wavelength conversion layer shown in FIG. 18A.
Figure 18D:
FIG. 18D is a binarized image showing the calculation region which is cut out from the cross section of the wavelength conversion layer shown in FIG. 18B.
Figure 19A:
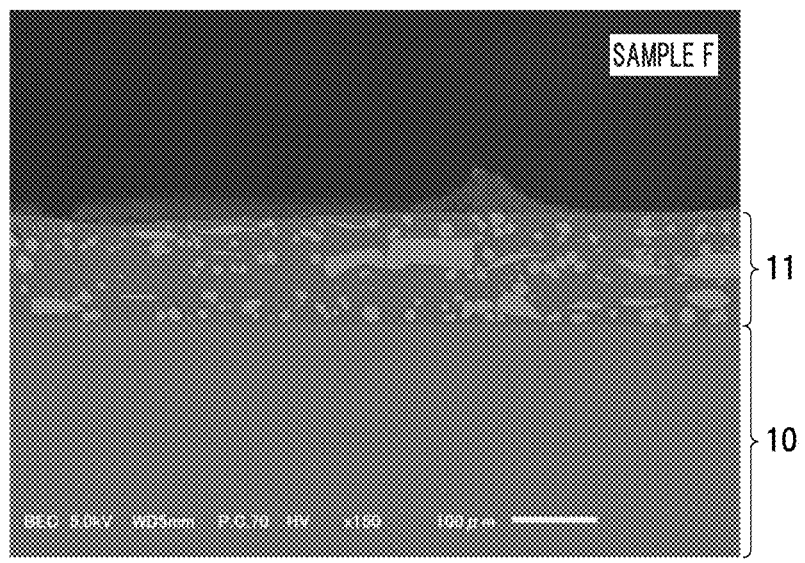
FIG. 19A is an SEM photograph showing a cross section of a sample F in Example 2.
Figure 19B:
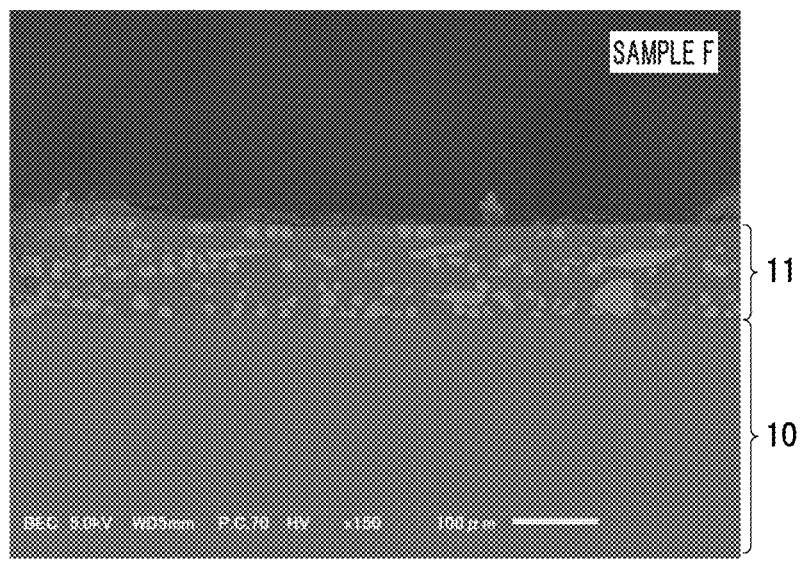
FIG. 19B is an SEM photograph showing another cross section of the sample F in Example 2.
Figure 19C:
FIG. 19C is a binarized image showing the calculation region which is cut out from the cross section of the wavelength conversion layer shown in FIG. 19A.
Figure 19D:
FIG. 19D is a binarized image showing the calculation region which is cut out from the cross section of the wavelength conversion layer shown in FIG. 19B.
Figure 20A:
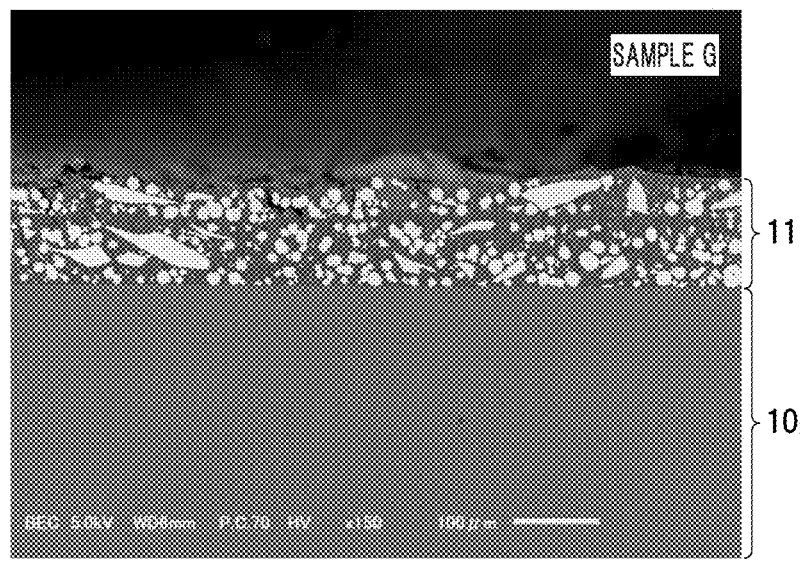
FIG. 20A is an SEM photograph showing a cross section of a sample G in Example 2.
Figure 20B:
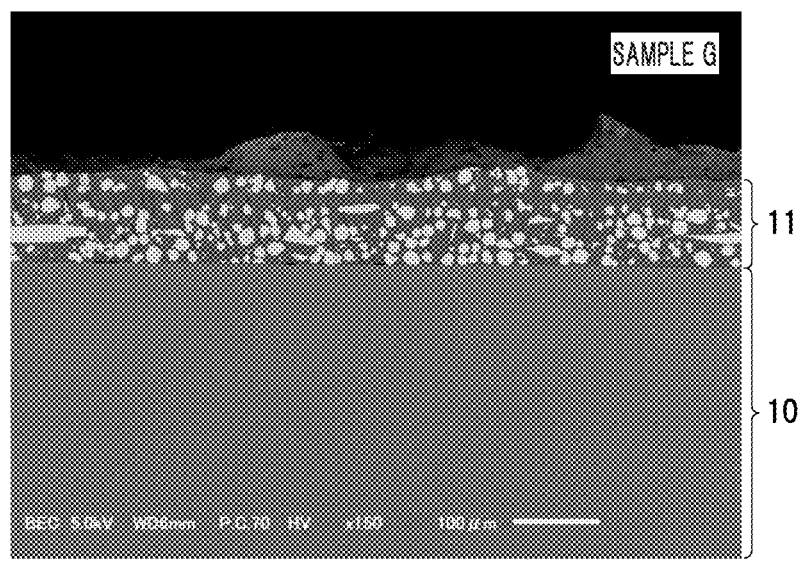
FIG. 20B is an SEM photograph showing another cross section of the sample G in Example 2.
Figure 20C:
FIG. 20C is a binarized image showing the calculation region which is cut out from the cross section of the wavelength conversion layer shown in FIG. 20A.
Figure 20D:
FIG. 20D is a binarized image showing the calculation region which is cut out from the cross section of the wavelength conversion layer shown in FIG. 20B.
Figure 21A:
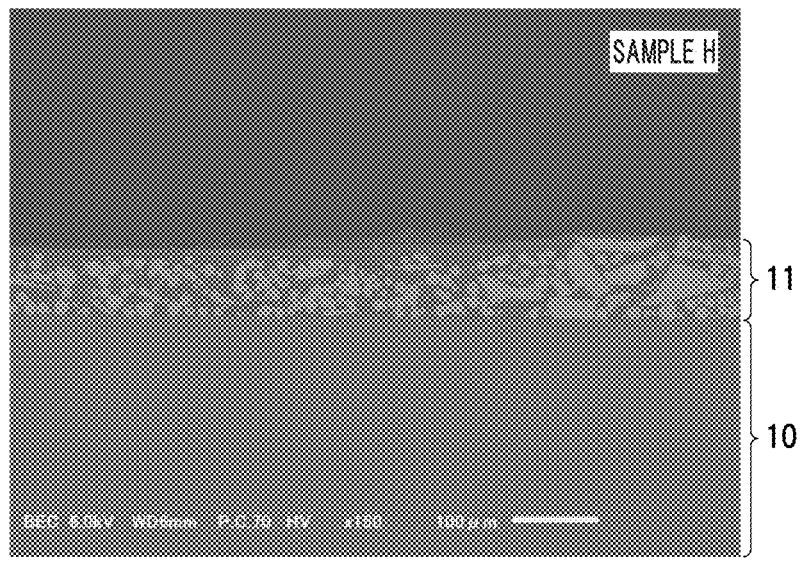
FIG. 21A is an SEM photograph showing a cross section of a sample H in Example 2.
Figure 21B:
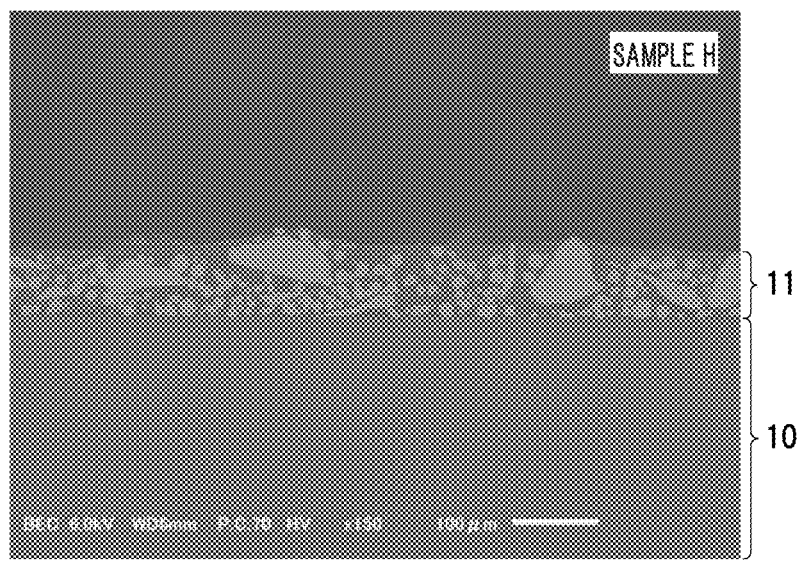
FIG. 21B is an SEM photograph showing another cross section of the sample H in Example 2.
Figure 21C:
FIG. 21C is a binarized image showing the calculation region which is cut out from the cross section of the wavelength conversion layer shown in FIG. 21A.
Figure 21D:
FIG. 21D is a binarized image showing the calculation region which is cut out from the cross section of the wavelength conversion layer shown in FIG. 21B.
Figure 22A:
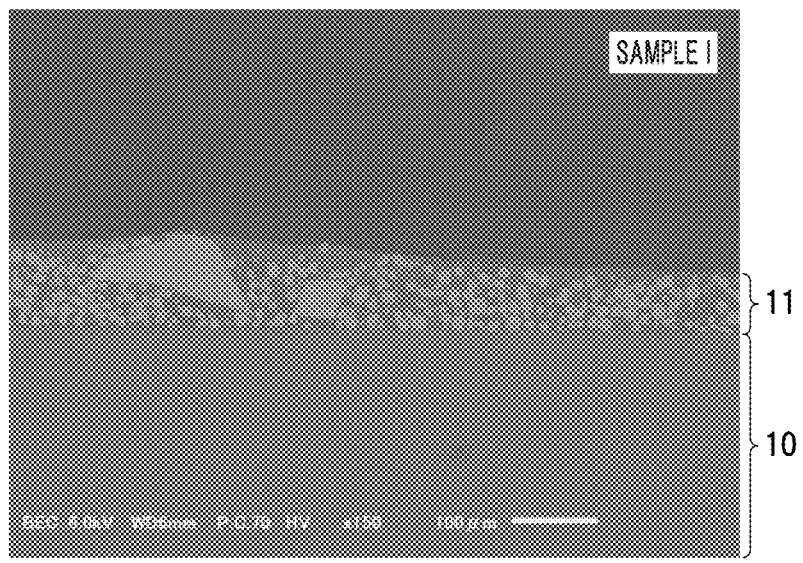
FIG. 22A is an SEM photograph showing a cross section of a sample I in Example 2.
Figure 22B:
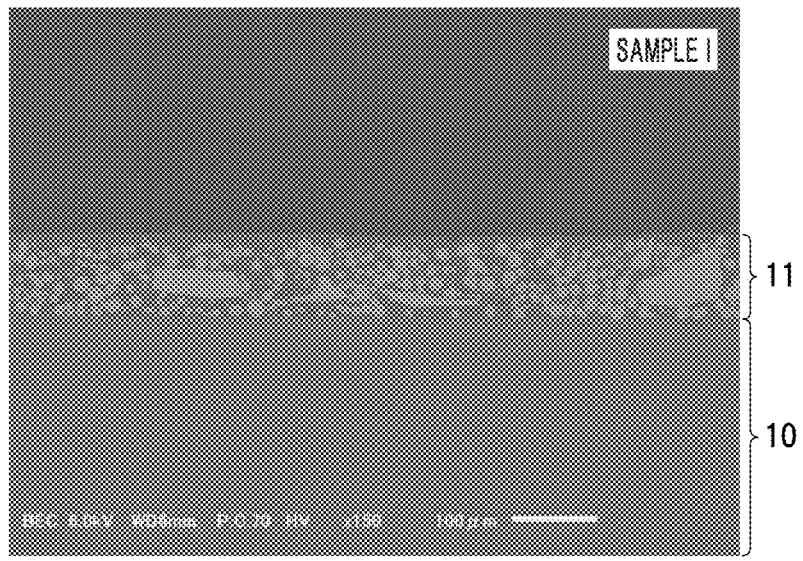
FIG. 22B is an SEM photograph showing another cross section of the sample I in Example 2.
Figure 22C:
FIG. 22C is a binarized image showing the calculation region which is cut out from the cross section of the wavelength conversion layer shown in FIG. 22A.
Figure 22D:
FIG. 22D is a binarized image showing the calculation region which is cut out from the cross section of the wavelength conversion layer shown in FIG. 22B.

FIGS. 13A and 13B are SEM photographs showing two cross sections of the wavelength conversion member in Comparative Example taken parallel to the thickness direction thereof. The two cross sections of the wavelength conversion member in Comparative Example do not include phosphor particle cross sections with the largest length of not less than 40 μm. FIGS. 13C and 13D are binarized images showing the calculation regions (rectangular regions with a width of 700 μm and a thickness of 50 μm from the bottom surface of the wavelength conversion layer 11) cut out from the cross sections of the wavelength conversion layer 11 respectively shown in FIGS. 13A and 13B. The cross-sectional area rate of the phosphor particle group 12 determined from the binarized images in FIGS. 13C and 13D was 46.2% and 46.7%.

The wavelength conversion characteristics in FIG. 12 were obtained by irradiating the wavelength conversion member 1, which has the phosphor particle group 12 composed of phosphor particles having a composition represented by a composition formula $(Y_{1-z}Ce_z)_3Al_5O_{12}$, with laser light as excitation light emitted from a laser diode.

In this regard, wavelength conversion characteristics similar to those shown in FIG. 12 are obtained also when the phosphor particle group 12 is composed of phosphor particles having a composition represented by a composition formula $(Lu_{1-z}Ce_z)_3Al_5O_{12}$, is composed of phosphor particles having a composition represented by a composition formula $(Y_{1-x-z}Gd_xCe_z)_3Al_5O_{12}$, is composed of phosphor particles having a composition represented by a composition formula $(Y_{1-x-z}Lu_xCe_z)_3Al_5O_{12}$, or is composed of phosphor particles including two or more of the following: phosphor particles having a composition represented by a composition formula $(Y_{1-z}Ce_z)_3Al_5O_{12}$, phosphor particles having a composition represented by a composition formula $(Lu_{1-z}Ce_z)_3Al_5O_{12}$, phosphor particles having a composition represented by $(Y_{1-x-z}Gd_xCe_z)_3Al_5O_{12}$, and phosphor particles having a composition represented by a composition formula $(Y_{1-x-z}Lu_xCe_z)_3Al_5O_{12}$.

Table 1 below shows numerical values of the plotted data points in FIG. 12. In Table 1, "Example" means an example of the wavelength conversion member 1, and "Comparative Example" means an example of the wavelength conversion member in Comparative Example (a product equivalent to the wavelength conversion member 1 shown in FIG. 6).

TABLE 1

| Excitation light Relative intensity | Comparative Example Relative intensity | Example Relative intensity |
|---|---|---|
| 0.06 | 0.05 | 0.05 |
| 0.16 | 0.16 | 0.17 |
| 0.25 | 0.28 | 0.29 |
| 0.34 | 0.39 | 0.41 |
| 0.44 | 0.50 | 0.52 |
| 0.53 | 0.61 | 0.63 |
| 0.63 | 0.71 | 0.73 |
| 0.72 | 0.81 | 0.84 |
| 0.81 | 0.89 | 0.94 |
| 0.91 | 0.96 | 1.04 |
| 1.00 | 1.00 | 1.13 |
| 1.09 | 0.97 | 1.22 |
| 1.19 |  | 1.31 |
| 1.28 |  | 1.4 |
| 1.37 |  | 1.47 |

TABLE 1-continued

| Excitation light Relative intensity | Comparative Example Relative intensity | Example Relative intensity |
|---|---|---|
| 1.47 | | 1.54 |
| 1.56 | | 1.6 |
| 1.66 | | 1.63 |

According to FIG. 12, the maximum intensity of the excitation light which can be used for the wavelength conversion member 1 is not less than about 1.7 times the maximum intensity of the excitation light which can be used for the wavelength conversion member in Comparative Example. This is because the heat transfer coefficient of the wavelength conversion layer is higher in the wavelength conversion member 1 than in the wavelength conversion member in Comparative Example, and temperature rise of the wavelength conversion layer can be suppressed in the wavelength conversion member 1. Thus, when the wavelength conversion member 1 is, e.g., a phosphor wheel as shown in FIGS. 10A and 10B, intensity of the laser light as the excitation light can be increased to not less than 1.7 times without decrease in wavelength conversion efficiency while keeping the wheel diameter constant, as compared to the phosphor wheel formed of the wavelength conversion member in Comparative Example. In this regard, with the laser excitation light source used here, it was not possible to measure to the point at which the fluorescence intensity of the wavelength conversion member 1 reaches saturation.

Meanwhile, when the intensity of the laser light is set constant, the wheel diameter can be reduced as compared to the phosphor wheel formed of the wavelength conversion member in Comparative Example. This allows the size of a housing of the laser projector to be reduced, and the product cost can be thereby reduced.

In addition, according to FIG. 12, the maximum fluorescence intensity of the wavelength conversion member 1 is not less than about 1.6 times the maximum fluorescence intensity of the wavelength conversion member in Comparative Example. Thus, when the wavelength conversion member 1 is, e.g., a phosphor wheel, brightness [lm] can be increased to not less than 1.6 times without decrease in wavelength conversion efficiency while keeping the wheel diameter constant, as compared to the phosphor wheel formed of the wavelength conversion member in Comparative Example. In this regard, with the laser excitation light source used here, it was not possible to measure brightness to the point at which the fluorescence intensity of the wavelength conversion member 1 reaches saturation. Thus, even if the wheel diameter is reduced, it is possible to ensure brightness equivalent to that of the phosphor wheel formed of the wavelength conversion member in Comparative Example.

Example 2

The wavelength conversion members 1 in the first embodiment including the substrate 10 and the wavelength conversion layer 11 formed under different conditions (referred to as samples A-I) were made and evaluated. The sample A-I here are phosphor wheels.

The sample A-I are phosphor wheels having the annular substrate 10 and the annular wavelength conversion layer 11. The sample A-I are configured such that the substrate 10 is formed of Al (aluminum), the sealing member 13 is formed of a silicone resin, and the phosphor particle group 12 is composed of particles of a single crystal YAG phosphor to which about 0.25 at % of Ce is added as an activator. Thicknesses of the wavelength conversion layers 11 of the samples A-I are about 100 µm.

The process of making the samples A-I is as follows. Firstly, a silicone resin weighed to be a design value is mixed with phosphor particles also weighed to be a design value, and a raw material of the wavelength conversion layer 11 is thereby obtained. Next, the raw material of the wavelength conversion layer 11 is printed on the substrate 10 by screen printing. The silicone resin is then cross-linked by baking in the atmosphere for 1 hour at 100° C. and then for another 2 hours at 150° C., thereby forming the wavelength conversion layer 11.

In screen printing which is a common printing technique, when the volume rate of the phosphor in the raw material of the wavelength conversion layer 11 is more than 50%, viscosity of the raw material of the wavelength conversion layer 11 increases due to too many solid components in the resin, making printing extremely difficult. In the present embodiment, the raw material is diluted with a solvent to reduce its viscosity at the time of printing, thereby enabling screen printing even when the volume rate of the phosphor is not less than 50%. Since the solvent which evaporates at not less than 100° C. is selected, it evaporates by the baking process in the atmosphere and the volume rate of the phosphor after baking can be increased.

FIGS. 14A, 14B-FIGS. 18A, 18B are SEM photographs of respective two cross sections of the samples A-E taken parallel to the thickness direction. The respective two cross sections of the samples A-E do not include phosphor particle cross sections with the largest length of not less than 40 µm.

FIGS. 19A, 19B-FIGS. 22A, 22B are SEM photographs of respective two cross sections of the samples F-I taken parallel to the thickness direction. The respective two cross sections of the samples F-I include phosphor particle cross sections with the largest length of not less than 40 µm.

FIGS. 14C, 14D-FIGS. 22C, 22D are binarized images showing the calculation regions (rectangular regions with a width of 700 µm and a thickness of 50 µm from the bottom surface of the wavelength conversion layer 11) cut out from the cross sections of the wavelength conversion layers 11 respectively shown in FIGS. 14A, 14B-FIGS. 22A, 22B. The cross-sectional area rate of the phosphor particle group 12 was determined from these binarized images.

Figure 23:
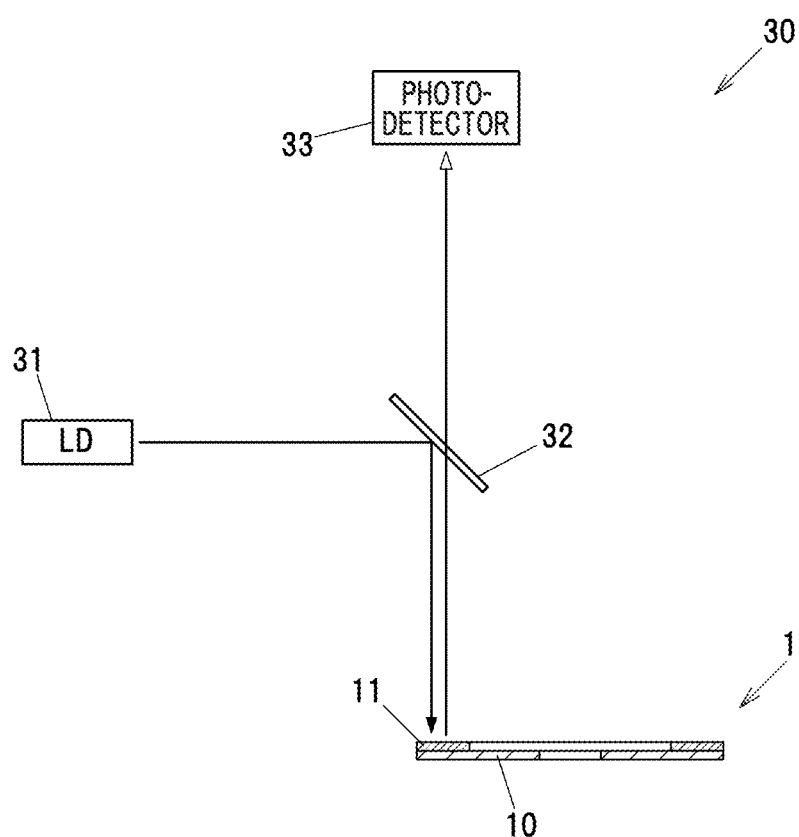
FIG. 23 is a schematic diagram illustrating a configuration of an optical evaluation setup in Example 2.

FIG. 23 is a schematic diagram illustrating a configuration of the optical evaluation setup 30 to evaluate intensity of fluorescence extracted from the samples A-I. The optical evaluation setup 30 is a laser projector evaluation system configured to evaluate characteristics of a wavelength conversion member when used in a laser projector, and has a blue laser diode 31 as a light source, a dichroic mirror 32 which reflects blue excitation light emitted from the laser diode 31 and transmits fluorescence emitted from the wavelength conversion layers 11 of the samples A-I, and a photodetector 33 to measure intensity of the fluorescence emitted from wavelength conversion layers 11 of the samples A-I.

The wavelength of the excitation light emitted by the laser diode 31 was set at 450 nm. The excitation light intensity of the laser diode 31 was varied within a range where the maximum excitation light intensity on the surface of the wavelength conversion layer 11 of each sample was up to about 110 W. The spot size of the excitation light (laser) on the surface of the wavelength conversion layer 11 was set so that a full width at half maximum (FWHM) of the size is 0.86 mm.

The evaluation results of the samples A-I are shown in Table 2 below. In "Phosphor cross-sectional area rate", (a) is the cross-sectional area rate of the phosphor particle group 12 in the calculation regions of the cross sections shown in FIG. 14A-FIG. 22A, and (b) is the cross-sectional area rate of the phosphor particle group 12 in the calculation regions of the cross sections shown in FIG. 14B-FIG. 22B. In "Number of large particles", (a) is the number of phosphor particle cross sections with the largest length of not less than 40 μm that are included in the calculation regions of the cross sections shown in FIG. 14A-FIG. 22A, and (b) is the number of phosphor particle cross sections with the largest length of not less than 40 μm that are included in the calculation regions of the cross sections shown in FIG. 14B-FIG. 22B. "Maximum fluorescence intensity" is the maximum intensity of fluorescence obtained when varying intensity of the excitation light.

TABLE 2

|  | Phosphor cross-sectional area rate [%] | | Number of large particles | | Maximum fluorescence intensity [W] |
| --- | --- | --- | --- | --- | --- |
|  | (a) | (b) | (a) | (b) |  |
| Sample A | 24.3 | 21.7 | 0 | 0 | 26.7 |
| Sample B | 35.9 | 30.7 | 0 | 0 | 30.2 |
| Sample C | 38.2 | 35.8 | 0 | 0 | 30.5 |
| Sample D | 49.5 | 51.0 | 0 | 0 | 30.5 |
| Sample E | 57.2 | 61.3 | 0 | 0 | 31.8 |
| Sample F | 21.0 | 21.6 | 4 | 2 | 30.3 |
| Sample G | 43.4 | 40.6 | 4 | 3 | 31.1 |
| Sample H | 54.3 | 54.5 | 6 | 8 | 33.7 |
| Sample I | 56.7 | 53.4 | 2 | 4 | 33.3 |

Figure 24A:
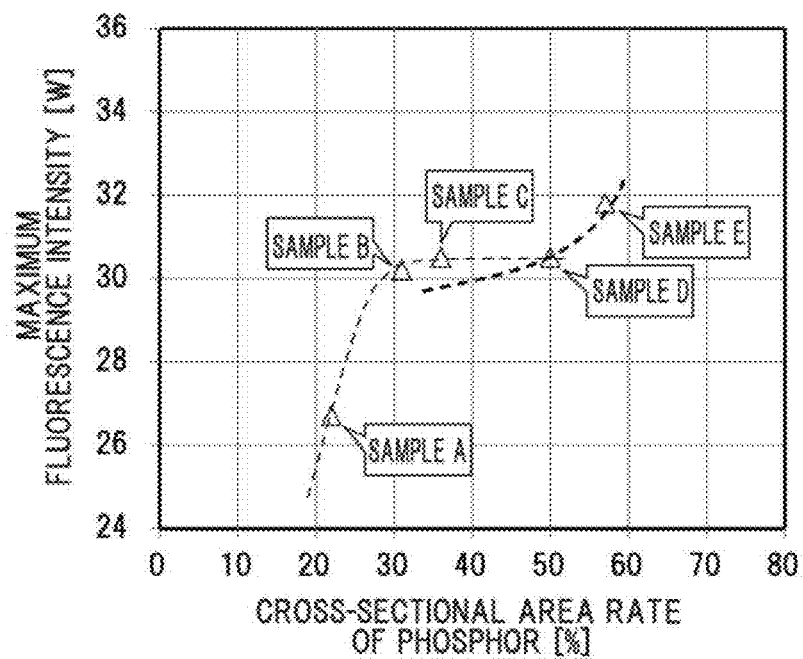
FIG. 24A is a graph showing a relationship between a cross-sectional area rate of a phosphor particle group and maximum fluorescence intensity of extracted fluorescence for the samples A-E in Example 2.

FIG. 24A is a graph showing a relationship between the smaller of the cross-sectional area rate values of the phosphor particle group 12 and the maximum fluorescence intensity of the extracted fluorescence for each of the samples A-E not including the phosphor particles 12a in the cross sections.

According to FIG. 24A, when the cross-sectional area rate of the phosphor particle group 12 is not more than about 30%, the maximum fluorescence intensity is low since the phosphor particle group 12 cannot absorb enough excitation light. The increase in the maximum fluorescence intensity slows down once when the cross-sectional area rate of the phosphor particle group 12 exceeds about 30%, which is thought to be because absorption of excitation light by the phosphor particle group 12 is saturated at about 30%.

However, the maximum fluorescence intensity increases again at the cross-sectional area rate of the phosphor particle group 12 of not less than 50%. It is considered that this is because the heat transfer coefficient of the wavelength conversion layer 11 begins to increase significantly and temperature rise of the phosphor particle group 12 is thereby suppressed. This theory can be derived from the relationship between a filler filling rate and thermal conductivity for general resin composite materials.

In general, the Bruggeman's equation $\varphi=(\lambda_c-\lambda_f)/(\lambda_m-\lambda_f)\times(\lambda_m/\lambda_c)^{1/3}$ holds true for the filler filling rate and thermal conductivity of resin composite materials, where $\varphi$ is the volumetric filling rate of the filler, $\lambda_f$ is thermal conductivity of the filler, $\lambda_m$ is thermal conductivity of the resin, and $\lambda_c$ is thermal conductivity of a coating composition.

Figure 24B:
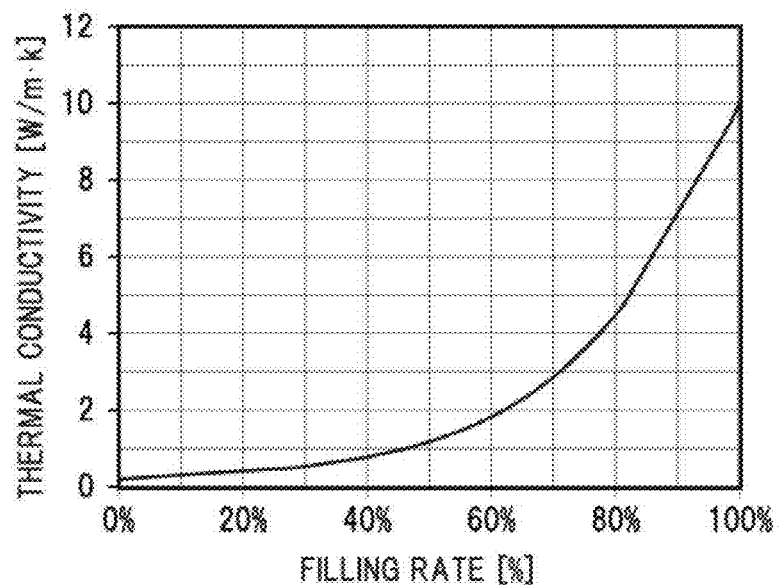
FIG. 24B shows a curve which is drawn based on Bruggeman's equation and shows an example of a relationship between a filler filling rate and thermal conductivity.

FIG. 24B shows a curve which is drawn based on Bruggeman's equation and shows an example of a relationship between the filler filling rate and thermal conductivity. The shape of this curve is close to the shape of an approximate curve in a region of FIG. 24A where the cross-sectional area rate of the phosphor particle group 12 is not less than 30% (a dotted line on the right side in the figure), and this fact supports the theory described above.

FIG. 24A shows that the cross-sectional area rate of the phosphor particle group 12 is preferably not less than 50%. In addition, higher maximum fluorescence intensity is obtained when the cross-sectional area rate of the phosphor particle group 12 is equal to or greater than the cross-sectional area rate in the sample E, i.e., not less than about 57%.

Figure 25:
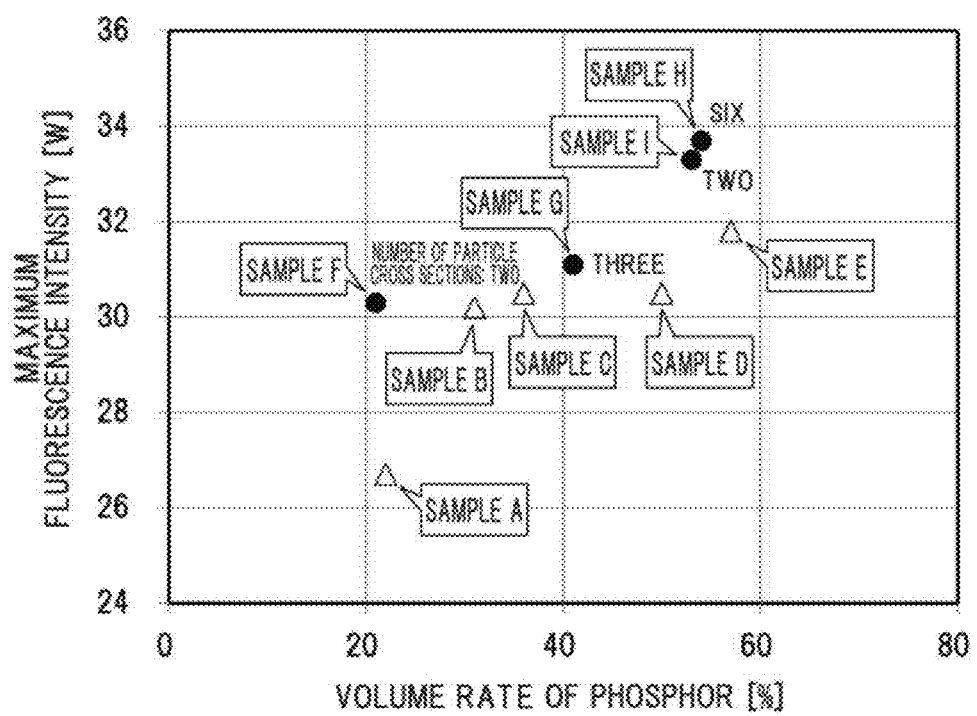
FIG. 25 is a graph showing a relationship between the cross-sectional area rate of the phosphor particle group and maximum intensity of extracted fluorescence for the samples A-I in Example 2.

FIG. 25 is a graph showing a relationship between the cross-sectional area rate of the phosphor particle group 12 and the maximum intensity of the extracted fluorescence for the samples A-E not including the phosphor particles 12a in the cross sections and the samples F-I including the phosphor particles 12a in the cross sections.

FIG. 25 shows that the fluorescence intensity relative to the cross-sectional area rate of the phosphor particle group 12 tends to be larger when the phosphor particles 12a are included in the cross sections than when the phosphor particles 12a are not included in the cross sections.

Each of "2", "3", "6", and "2" in FIG. 25 represents the smaller of the numbers of phosphor particle cross sections with the largest length of not less than 40 μm that were included in the calculation regions of the two cross sections of each of the samples F-I. Based on FIG. 25, the fluorescence intensity relative to the cross-sectional area rate of the phosphor particle group 12 becomes large when not less than two phosphor particle cross sections with the largest length of not less than 40 μm are included in the calculation region of the cross section of the wavelength conversion layer 11.

Example 3

Figure 26A:
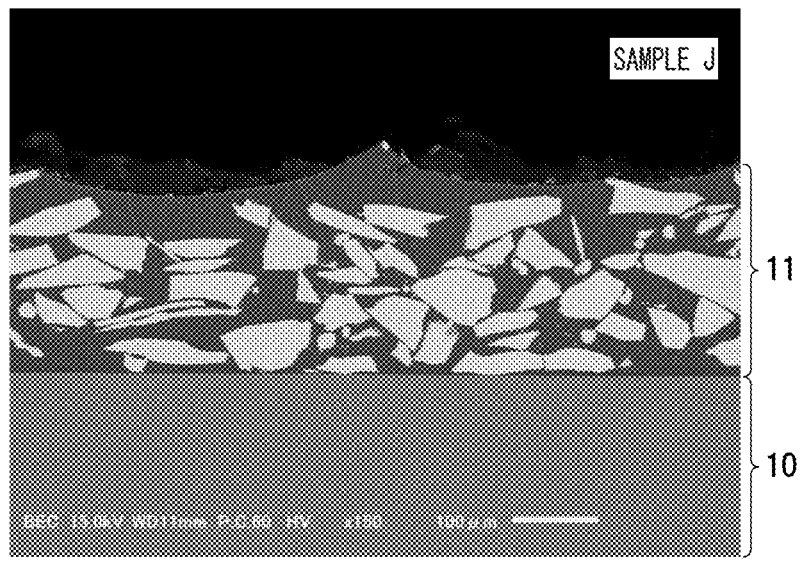
FIG. 26A is an SEM photograph showing a cross section of a sample J in Example 3 taken parallel to a thickness direction thereof.
Figure 26B:
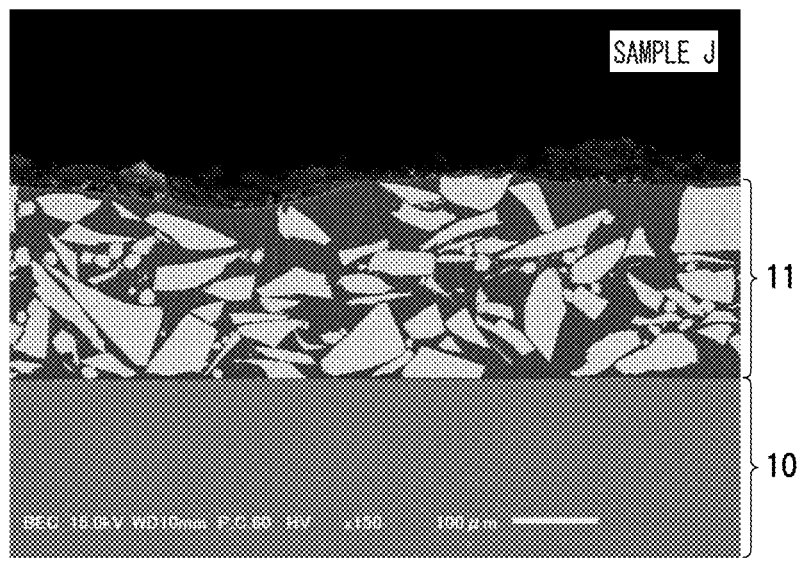
FIG. 26B is an SEM photograph showing another cross section of the sample J in Example 3 taken parallel to the thickness direction thereof.
Figure 26C:
FIG. 26C is a binarized image showing the calculation region which is cut out from the cross section of the wavelength conversion layer shown in FIG. 26A.
Figure 26D:
FIG. 26D is a binarized image showing the calculation region which is cut out from the cross section of the wavelength conversion layer shown in FIG. 26B.

FIGS. 26A and 26B are SEM photographs of two cross sections, parallel to the thickness direction, of a sample having particularly high luminescence properties (referred to as a sample J) among the samples prepared by the present inventors. FIG. 26C and FIG. 26D are binarized images showing the calculation regions which are respectively cut out from the cross sections of the wavelength conversion layer 11 shown in FIGS. 26A and 26B.

The sample J is a phosphor wheel having the annular substrate 10 and the annular wavelength conversion layer 11, in the same manner as the sample A-I. The sample J is configured such that the substrate 10 is formed of Al (aluminum), the sealing member 13 is formed of a silicone resin, and the phosphor particle group 12 is composed of particles of a single crystal YAG phosphor to which about 0.25 at % of Ce is added as an activator. The thickness of the wavelength conversion layer 11 of the sample J is about 225 μm.

Even when the volume rate of the phosphor in the raw material of the wavelength conversion layer 11 is more than 50%, the raw material of the wavelength conversion layer 11 can be screen-printed by diluting it with a solvent, as described above in the description of the process of making the samples A-I. However, in case that the number of large-diameter phosphors in the raw material is increased (the rate with respect to small-diameter phosphors is increased), there is a problem that the printing screen mesh is likely to be damaged and its durability decreases. Therefore, a manufacturing method solving this problem was found and applied to the process of making the sample J.

Firstly, a phosphor particle group 12 (including large particles and small particles) weighed to a design value is mixed. Next, only the silicone resin is screen-printed on the substrate 10. The thickness of the silicone resin at this time is set to 5-30 μm according to the finished film thickness of the wavelength conversion layer 11 (about 20 μm for the sample J shown in FIG. 26).

Next, the mixed phosphor particle group 12 is dropped (sprinkled) onto the printed silicone resin. Instead of dropping the phosphor particle group 12 onto the silicone resin, the substrate 10 with silicone resin printed thereon may be pressed against a container containing the phosphor particle group 12.

Next, the silicone resin with the sprinkled phosphor particle group 12 is compressed via a pressure plate at a pressure of 0.1-0.5 MPa, typically 0.2 MPa. At this time, the density of the phosphor particle group 12 can be effectively increased by shaking or vibrating the pressure plate to free the mutually hooked particles. If the applied pressure is too low, the density of the phosphor particle group 12 is not sufficiently increased. If too high, the silicone resin spreads too much and a designed film thickness cannot be obtained unless some measures to prevent lateral spread of the silicone resin in a plane direction of the substrate 10 are taken.

Next, phosphor powder which did not adhere is removed by air blow. The silicone resin is then cross-linked by baking in the atmosphere for 1 hour at 100° C. and then for another 2 hours at 150° C., thereby forming the wavelength conversion layer 11. In such a making process, the problem in the process using screen printing described in the description of the process of making the samples A-I does not occur.

The evaluation result of the sample J is shown in Table 3 below. The intensity of the fluorescence extracted from the sample J was measured by using the optical evaluation setup 30 described above, in the same manner as the samples A-I. The diameter of the phosphor wheel as the sample J is about 40 mm

TABLE 3

|  | Phosphor cross-sectional area rate [%] | | Number of large particles | | Maximum fluorescence |
| --- | --- | --- | --- | --- | --- |
|  | (a) | (b) | (a) | (b) | intensity [W] |
| Sample J | 50.5 | 57.0 | 12 | 16 | 45.7 |

Figure 27A:
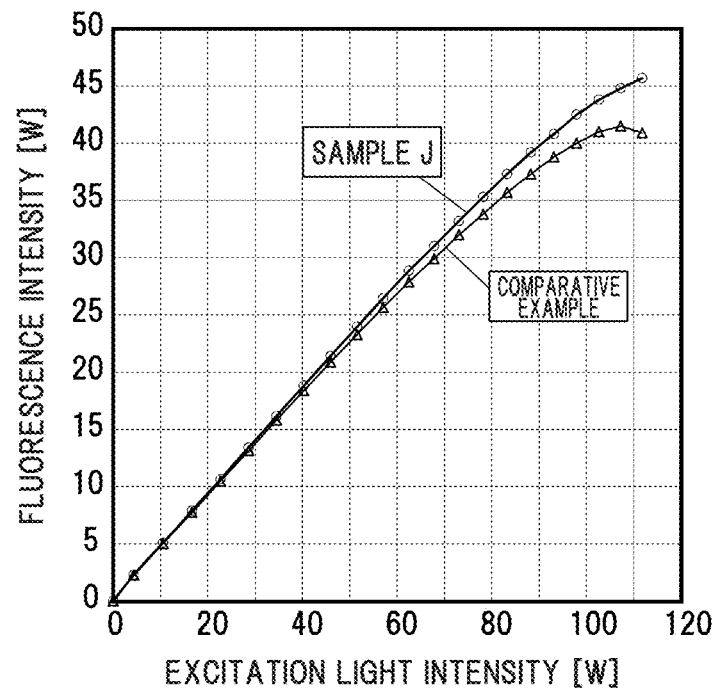
FIG. 27A is a graph showing wavelength conversion characteristics of the sample J in Example 3.

FIG. 27A is a graph showing wavelength conversion characteristics of the sample J as the wavelength conversion member 1. In FIG. 27A, the horizontal axis indicates intensity [W] of the excitation light applied to the sample J, and the vertical axis indicates intensity [W] of fluorescence wavelength-converted by the wavelength conversion layer 11 of the sample J. FIG. 27A also shows wavelength conversion characteristics of the wavelength conversion member 50 shown in FIG. 5 as Comparative Example. This wavelength conversion member 50 in Comparative Example has a structure in which the wavelength conversion layer 51 formed of a phosphor ceramic plate is bonded onto the substrate 53 by the silicone resin 52.

According to FIG. 27A, the fluorescence intensity of the wavelength conversion member 50 as Comparative Example decreases due to temperature quenching around when the excitation light intensity exceeds 100 W, but the fluorescence intensity of the sample J continues to increase even after the excitation light intensity exceeds 100 W. This effect is due to the high volume rate of the phosphor particle group 12, the large number of large particles, and the fact that the large particles are single-crystal phosphors.

Figure 27B:
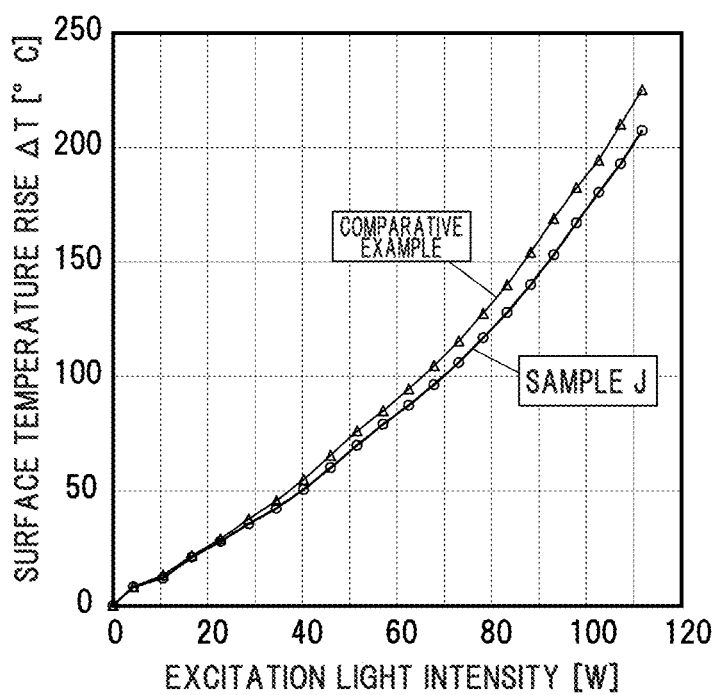
FIG. 27B is a graph showing temperature characteristics of the sample J and a wavelength conversion member in Comparative Example.

FIG. 27B is a graph showing surface temperature rise of the wavelength conversion layer when the sample J and the wavelength conversion member 50 were irradiated with laser.

In the graph of FIG. 27B, the horizontal axis indicates intensity [W] of the excitation light, and the vertical axis indicates a surface temperature rise amount ΔT [° C.] of the wavelength conversion layer 11 of the sample J and the wavelength conversion layer 51 of the wavelength conversion member 50. The surface temperature rise amount ΔT here is based on the surface temperature before irradiation with the excitation light.

FIG. 27B shows that the surface temperature rise amount ΔT with respect to the excitation light intensity is smaller in the sample J than in the wavelength conversion member 50, and temperature rise of the sample J is effectively suppressed.

The obtained evaluation results show that the sample J has excellent characteristics in the optical evaluation setup 30 which is the projector evaluation system as described above, and it was confirmed that the sample J exhibits excellent performance as a wavelength conversion member for projector.

Example 4

Next evaluated is the effect of the presence of the pores 120 in the wavelength conversion member 1 including the wavelength conversion layer 11 shown in FIG. 3 in which the phosphor particles 12a containing plural pores 120 therein are included in the phosphor particle group 12 (referred to as a sample K).

The sample K is a phosphor wheel having the annular substrate 10 and the annular wavelength conversion layer 11, in the same manner as the sample A-J. The sample K is configured such that the substrate 10 is formed of Al (aluminum), the sealing member 13 is formed of a silicone resin, and the phosphor particle group 12 is composed of particles of a single crystal YAG phosphor to which about 0.25 at % of Ce is added as an activator. The phosphor particles 12a containing the plural pores 120 therein are formed of a sintered body of single crystal particles. The thickness of the wavelength conversion layer 11 of the sample K is about 110 μm, and the phosphor cross-sectional area rate determined from the SEM image is 55%. The method used to form the wavelength conversion layer 11 of the sample K was the same as the method for forming the wavelength conversion layer 11 of the sample J described above.

Figure 28:
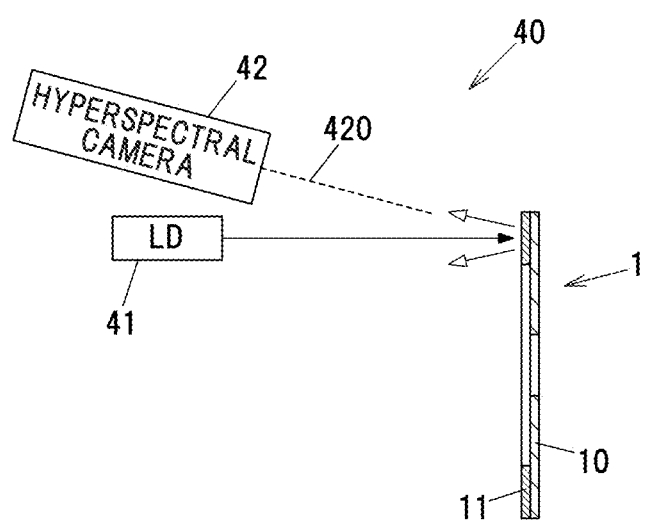
FIG. 28 is a schematic diagram illustrating a configuration of an optical evaluation setup in Example 4.

FIG. 28 is a schematic diagram illustrating a configuration of an optical evaluation setup 40 used for measurement on the sample K. This optical evaluation setup 40 has a blue laser diode 41 as a light source, and a hyperspectral camera 42 to measure a spectrum of fluorescence emitted from the wavelength conversion layer 11 of the sample K. The hyperspectral camera 42 is a camera with spatial resolution and wavelength resolution. An angle formed by an incident direction of laser emitted from the laser diode 41 and a direction of an optical axis 420 of the hyperspectral camera 42 was set to 55°.

Figure 29:
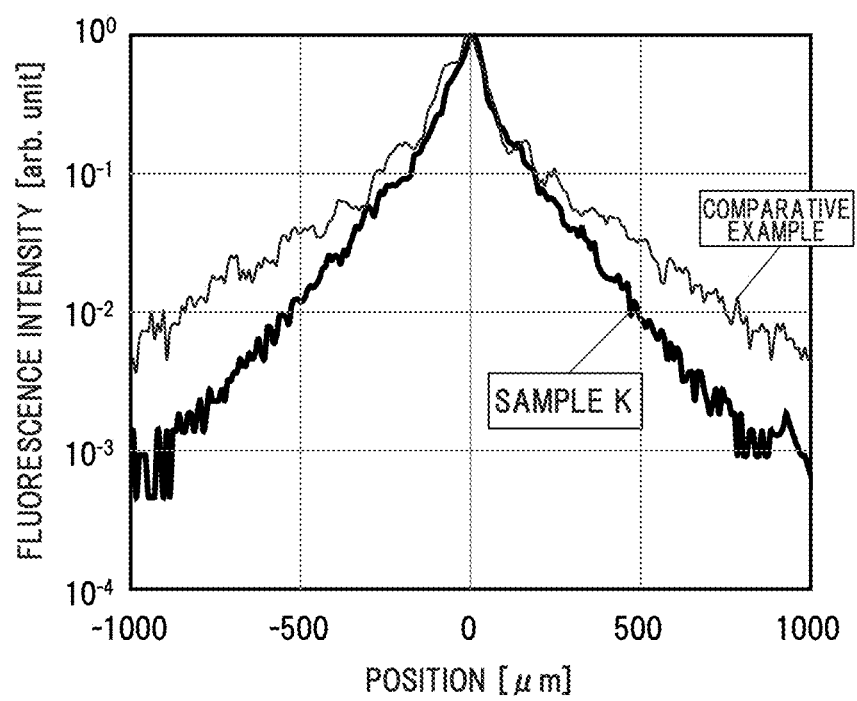
FIG. 29 is a graph showing an amount of spreading of fluorescence extracted from the wavelength conversion layer of a sample K in Example 4.

FIG. 29 is a graph showing an amount of spreading of fluorescence with a wavelength of 540 nm extracted from the wavelength conversion layer 11 of the sample K when irradiated with laser light having a wavelength of 450 nm and a spot size of 80 μm. FIG. 29 also shows characteristics of the wavelength conversion member as Comparative Example which is different from the sample K only in that the phosphor particles 12a do not contain the pores 120 therein.

In the graph of FIG. 29, the horizontal axis indicates a position on the surface of the wavelength conversion layer 11, and the vertical axis indicates intensity of fluorescence wavelength-converted by the wavelength conversion layer 11 and having a wavelength 540 nm. Here, the position on the surface of the wavelength conversion layer 11 on the horizontal axis is expressed as a distance from the center of the excitation light irradiation spot. In addition, data of fluorescence intensity of the sample K and the wavelength conversion member in Comparative Example are normalized so that the peak value of the fluorescence intensity of the sample K coincides with the peak value of the fluorescence intensity of the wavelength conversion member in Comparative Example.

FIG. 29 shows that spreading of the peak is smaller in the sample K than in the wavelength conversion member in Comparative Example, and spreading of light extracted from the wavelength conversion layer 11 is smaller. The small spreading of light increases coupling efficiency in a light collection optical system and projector efficiency can be thereby increased.

Although the embodiments and Examples of the invention have been described, the invention is not intended to be limited to the embodiments and Examples, and the various kinds of modifications can be implemented without departing from the gist of the invention. In addition, the constituent elements in the embodiments and Examples can be arbitrarily combined without departing from the gist of the invention.

In addition, the invention according to claims is not to be limited to the embodiments and Examples described above. Further, it should be noted that not all combinations of the features described in the embodiments and Examples are necessary to solve the problem of the invention.

INDUSTRIAL APPLICABILITY

Provided is a wavelength conversion member which has excellent heat conducting properties, can be irradiated with high intensity excitation light to allow high intensity fluorescence to be extracted, and allows a wide range of choices for a material of a sealing member.

REFERENCE SIGNS LIST 1, 2, 50 WAVELENGTH CONVERSION MEMBER
10, 53 SUBSTRATE
10a HOLE
11, 21, 51 WAVELENGTH CONVERSION LAYER
12 PHOSPHOR PARTICLE GROUP
12a, 12b PHOSPHOR PARTICLE
13 SEALING MEMBER
14, 14a, 14a HIGH-REFLECTANCE LAYER
15 LOW-REFRACTIVE-INDEX RESIN FILM
16 ADDITIVE
21a UPPER LAYER
21b LOWER LAYER
30, 40 OPTICAL EVALUATION SETUP
31, 41 LASER DIODE
32 DICHROIC MIRROR
33 PHOTODETECTOR
42 HYPERSPECTRAL CAMERA
420 OPTICAL AXIS
60 IRRADIATION POSITION
52 SILICONE RESIN
120 PORE
141 Ag-BASED FILM
142 PROTECTIVE FILM
143 LOW-REFRACTIVE-INDEX RESIN
144 HIGH-REFRACTIVE-INDEX PARTICLE

The invention claimed is:

1. A wavelength conversion member, comprising:
a support; and
a wavelength conversion layer that comprises a phosphor particle group and a sealing member to seal the phosphor particle group and that is provided directly or through an other layer on the support,
wherein a predetermined region, in which a cross-sectional area rate of the phosphor particle group is not less than 50%, is included in an arbitrary cross section of the wavelength conversion layer taken parallel to a thickness direction thereof,
wherein the predetermined region comprises a rectangular region with a width of 700 μm and a thickness of 50 μm from a bottom surface of the wavelength conversion layer when a thickness of the wavelength conversion layer is not less than 50 μm, and the predetermined region comprises a rectangular region with a width of 700 μm and a thickness equal to the thickness of the wavelength conversion layer when the thickness of the wavelength conversion layer is less than 50 μm,
wherein the phosphor particle group comprises a large-diameter phosphor particle having a cross section with a largest length of not less than 40 μm in a cross section parallel to the thickness direction of the wavelength conversion layer, and a small-diameter phosphor particle having a cross section with a largest length of not more than 30 μm in the cross section parallel to the thickness direction of the wavelength conversion layer,
wherein the predetermined region comprises two or more of the large-diameter phosphor particle having the cross section with the largest length of not less than 40 μm, and
wherein the large-diameter phosphor particle comprises a single-crystal phosphor particle and the small-diameter phosphor particle comprises a single-crystal phosphor particle and/or a polycrystalline phosphor particle.

2. The wavelength conversion member according to claim 1, wherein the phosphor particle group comprises phosphor particles comprising a plurality of pores therein.

3. The wavelength conversion member according to claim 1, wherein the phosphor particle group comprises phosphor particles with curved surfaces.

4. The wavelength conversion member according to claim 1, wherein the sealing member comprises a dimethyl-based silicone resin.

5. The wavelength conversion member according to claim 1, wherein the sealing member mainly comprises a $SiO_2$-based compound.

6. The wavelength conversion member according to claim 1, wherein in addition to the phosphor particle group, an additive having a higher thermal conductivity than the phosphor particles constituting the phosphor particle group is sealed with the sealing member in the wavelength conversion layer.

7. The wavelength conversion member according to claim 6, wherein the additive comprises $Al_2O_3$, SiC, diamond (C), AlN, BN, $Si_3N_4$, or MgO.

8. The wavelength conversion member according to claim 1, wherein at least some of the single crystal phosphor particles have a composition within a range represented by a composition formula $(Y_{1-x-y-z}Lu_xGd_yCe_z)_{3+a}Al_{5-a}O_{12}$ ($0 \leq x \leq 0.9994$, $0 \leq y \leq 0.0669$, $0.0002 \leq z \leq 0.0067$, $-0.016 \leq a \leq 0.315$).

9. The wavelength conversion member according to claim 1, further comprising a low-refractive-index layer that has a lower refractive index than the sealing member and is provided on the wavelength conversion layer.

10. The wavelength conversion member according to claim 9, wherein a thickness of the low-refractive-index layer is not less than 5 μm.

* * * * *